US012664049B1

(12) United States Patent
Fukuhisa

(10) Patent No.: US 12,664,049 B1
(45) Date of Patent: Jun. 23, 2026

(54) DEFECTIVE SECTOR MANAGEMENT FOR MAGNETIC DATA STORAGE DISKS

(71) Applicant: Western Digital Technologies, Inc., San Jose, CA (US)

(72) Inventor: Ryoji Fukuhisa, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/001,492

(22) Filed: Dec. 25, 2024

(51) Int. Cl.
*G06F 11/20* (2006.01)
*G06F 11/10* (2006.01)

(52) U.S. Cl.
CPC ................................ *G06F 11/1068* (2013.01)

(58) Field of Classification Search
CPC ......... G06F 11/1068; G06F 2212/1032; G11B 20/1883; G11B 20/1893; G11B 20/1896; G11C 29/70; G11C 29/838
USPC ........................................ 714/6.13
See application file for complete search history.

(56) References Cited

U.S. PATENT DOCUMENTS

| | | | |
|---|---|---|---|
| 5,917,724 A | 6/1999 | Brousseau et al. | |
| 5,974,544 A | 10/1999 | Jeffries et al. | |
| 6,154,858 A | 11/2000 | Ottesen et al. | |
| 6,205,099 B1 * | 3/2001 | Sasaki | G11B 20/1883 |
| 6,263,459 B1 | 7/2001 | Schibilla | |
| 8,924,793 B1 | 12/2014 | Lee | |
| 2002/0191319 A1 | 12/2002 | Liew et al. | |
| 2003/0163756 A1 * | 8/2003 | George | G11B 20/1883 |
| 2004/0100715 A1 * | 5/2004 | Smith | G11B 20/1883 |
| 2007/0174664 A1 | 7/2007 | Carmitchel et al. | |
| 2014/0327981 A1 * | 11/2014 | Marrow | G11B 20/1879 360/31 |
| 2015/0179214 A1 | 6/2015 | Pantel | |

(Continued)

FOREIGN PATENT DOCUMENTS

| | | |
|---|---|---|
| JP | 2006338739 A | 12/2006 |
| KR | 20090011247 A | 2/2009 |

OTHER PUBLICATIONS

MRTLab; "Analysis of Seagate Sector Access Interruption"; available at: http://en.mrtlab.com/analysis-of-seagate-sector-access-interruption; Jan. 22, 2018.

(Continued)

*Primary Examiner* — Chae M Ko
(74) *Attorney, Agent, or Firm* — Barry IP Law, P.C.

(57) ABSTRACT

A Data Storage Device (DSD) includes at least one disk and at least one memory storing an active Primary defect List (P-List) indicating defective sectors identified during formatting, a Grown defect List (G-List) indicating defective sectors identified after formatting, and an inactive P-List including entries for accepting entries from the G-List. Entries of the G-List are merged into the P-List by successively reassigning descending sets of logical addresses from respective sets of sectors to a temporary storage area and reserving at least a portion of the sectors for a set of shifting P-List entries. Entries of the shifting P-List entries are retained in the inactive P-List for grown defect sectors, and the set of shifting P-List entries is reduced by the number of retained entries before shifting toward a next set of sectors. The descending sets of logical addresses are reassigned from the temporary storage area back to non-defect sectors.

20 Claims, 12 Drawing Sheets

(56) References Cited

U.S. PATENT DOCUMENTS

2016/0148647 A1 *   5/2016   Park ................... G11B 20/1889
369/53.41

OTHER PUBLICATIONS

StackExchange; "How to move G-List bad sectors into P-List and reassign LBA"; available at: https://superuser.com/questions/1612557/how-to-move-g-list-bad-sectors-into-p-list-and-reassign-lba; Dec. 25, 2020.

* cited by examiner

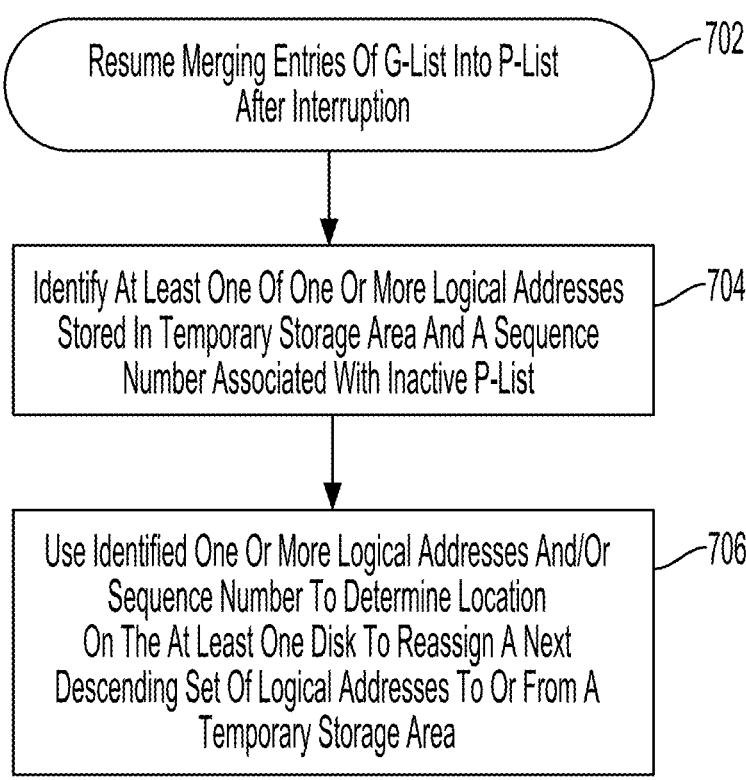

Resume Merging Entries Of G-List Into P-List
After Interruption — 702

Identify At Least One Of One Or More Logical Addresses
Stored In Temporary Storage Area And A Sequence
Number Associated With Inactive P-List — 704

Use Identified One Or More Logical Addresses And/Or
Sequence Number To Determine Location
On The At Least One Disk To Reassign A Next
Descending Set Of Logical Addresses To Or From A
Temporary Storage Area — 706

FIG. 7

DEFECTIVE SECTOR MANAGEMENT FOR MAGNETIC DATA STORAGE DISKS

BACKGROUND

Data Storage Devices (DSDs) are often used to record data onto or to reproduce data from storage media. One type of storage media includes a rotating disk, such as in a Hard Disk Drive (HDD). In such DSDs, user data is magnetically stored in sectors arranged in concentric circular tracks on the disk surfaces. Due to manufacturing processes, some of the sectors may be defective or otherwise unable to reliably store data or reliably have data read from the defective sectors. These defective sectors are usually identified by the DSD manufacturer when formatting the disk surfaces and are referred to as "primary defects."

The primary defects are added to a Primary defect List (P-List) so that the defective sectors are skipped during operation and made unavailable for storing data. In this regard, the P-List may keep the physical locations of the defective sectors from appearing in a logical to physical mapping or translation table used to read and write data logically addressed by a host.

Defective sectors that are identified after formatting the disk surfaces or during operation of the DSD are referred to as "grown defects." The grown defects are typically added to a Grown defect List (G-List) that is used similarly to the P-List to skip defective sectors during operation. Any data stored in a grown defect sector may be attempted to be relocated to another sector, and the logical to physical translation table may be updated to remove the grown defect's physical location to prevent data from being written to the grown defect sector.

As the amount of data stored in modern DSDs continues to increase, the number of sectors on disk surfaces has also increased to store more data. The greater number of sectors, in addition to a smaller physical size of the sectors, has generally caused an increase in the number of grown defects added to the G-List during operation. In some cases, the G-List may need to be increased to accommodate a larger number of grown defects. However, moving grown defect locations from the G-List to available spaces in the P-List is typically not an option in the field because merging the G-List into the P-List can conventionally only be performed using a formatting command (e.g., a format unit command) that reformats the disk surfaces.

Reformatting the disk surfaces can take one or more days to complete and also reinitializes the logical to physical translation table, which effectively erases all of the user data stored on the disk surfaces.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 7 is a flowchart for a G-List merge resuming process after an interruption according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Data Storage Device

Figure 1:
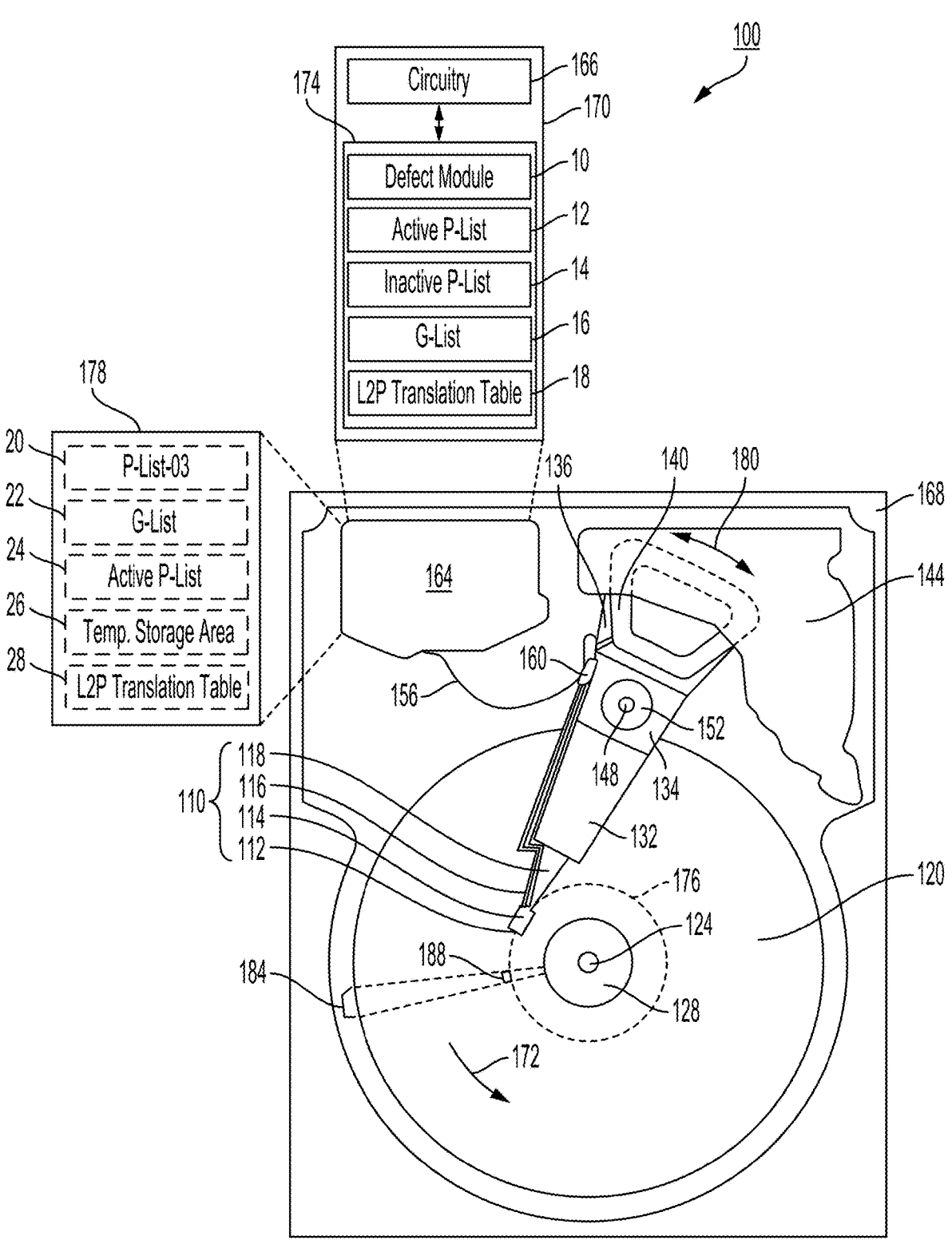
FIG. 1 is a plan view of an example Data Storage Device (DSD) according to one or more embodiments.

FIG. 1 is a plan view of an example Data Storage Device (DSD) 100 according to one or more embodiments to illustrate an exemplary operating environment. In some implementations, DSD 100 can include a Hard Disk Drive (HDD) or other type of DSD including a rotating magnetic disk as a data recording medium, such as a Solid-State Hybrid Drive (SSHD) that can include solid-state non-volatile memory in addition to one or more disks.

As shown in the example of FIG. 1, DSD 100 includes slider 114 that includes magnetic reading/recording head 112. Collectively, slider 114 and head 112 may be referred to as a head slider. DSD 100 further includes at least one Head Gimbal Assembly (HGA) 110 including the head slider, lead suspension 116 attached to the head slider typically via a flexure, and load beam 118 attached to lead suspension 116.

DSD 100 also includes at least one disk 120 rotatably mounted on spindle 124 and a drive motor (not visible) attached to spindle 124 for rotating disk 120. Head 112 includes a writer or write element and a reader or read element for respectively writing and reading data stored on disk 120 of DSD 100. Disk 120 or a plurality of disks stacked below disk 120 may be affixed to spindle 124 with disk clamp 128.

As shown in FIG. 1, DSD 100 further includes arm 132 attached to HGA 110, carriage 134, a Voice-Coil Motor (VCM) that includes armature 136 and voice coil 140 attached to carriage 134 and stator 144 including a voice-coil magnet (not visible). Armature 136 of the VCM is attached to carriage 134 and is configured to move arm 132 and HGA 110, to access portions of disk 120, being mounted on pivot shaft 148 with interposed pivot-bearing assembly 152. In the case of multiple disks, carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a Head Stack Assembly (HSA). An HSA may, however, include more or fewer components than those described. For example, an HSA may refer to an assembly that further includes electrical interconnection components. Generally, an HSA is the assembly configured to move the head slider to access portions of the disk 120 for read and write operations.

With further reference to FIG. 1, electrical signals (e.g., current to voice coil 140 of the VCM) comprising a write signal to and a read signal from head 112, are provided by flexible interconnect cable 156 ("flex cable"). Arm-Electronics (AE) module 160, which may have an on-board pre-amplifier for the read signal, as well as other read-channel and write-channel electronic components, provides connection between flex cable 156 and head 112. AE module 160 may be attached to carriage 134 as shown or may be included as part of circuitry 166 of controller 170. Flex cable 156 is coupled to electrical connector block 164, which provides electrical communication to controller 170 located beneath electrical connector block 164 through electrical feedthroughs provided by base or housing 168. In conjunction with a cover, housing 168 provides a sealed, protective enclosure for the data storage components of DSD 100.

Other electronic components, including a disk controller and servo electronics that can further include a Digital Signal Processor (DSP), provide electrical signals to the drive motor, voice coil 140 of the VCM, and head 112 of the HGA 110. The electrical signal provided to the drive motor enables the drive motor to spin providing a torque to spindle 124, which is in turn transmitted to disk 120 that is affixed to spindle 124. As a result, disk 120 spins in direction 172. The disk 120 creates a cushion of gas that acts as a gas-bearing on which the Gas-Bearing Surface (GBS) of slider 114 rides so that slider 114 flies above the surface of disk 120 without contacting a thin magnetic-recording layer of disk 120 in which data is recorded.

The electrical signal provided to voice coil 140 of the VCM enables head 112 of HGA 110 to access tracks, such as track 176, in which data is recorded. Thus, armature 136 of the VCM swings through an arc 180, which enables head 112 of HGA 110 to access various tracks on disk 120. Data is stored on disk 120 in a plurality of radially nested tracks arranged in sectors on disk 120, such as sector 188 of track 176 within wedge 184. Each track on the disk surface is composed of a plurality of sectors, such as sector 188, that may store recorded data and a header containing a servo-burst-signal pattern. The servo-burst signal pattern may include, for example, an ABCD-servo-burst-signal pattern, which is information that identifies track 176, and error correction code information. In accessing track 176, the read element of head 112 of HGA 110 reads the servo-burst-signal pattern, which provides a Position-Error-Signal (PES) to the servo electronics, which controls the electrical signal provided to voice coil 140 of the VCM, enabling head 112 to follow track 176. Upon finding track 176 and identifying sector 188, head 112 either reads data from track 176 or writes data to track 176 depending on instructions, such as instructions received by controller 170 from an external host, such as a microprocessor of a computer system.

In the example of FIG. 1, controller 170 is shown with dashed lines connected to electrical connector block 164 to indicate that controller 170 is in electrical communication with electrical connector block 164. As will be appreciated by those of ordinary skill in the art, controller 170 in some implementations can include a Printed Circuit Board (PCB) coupled to the bottom side of DSD 100, such as to housing 168. As shown in the example of FIG. 1, controller 170 includes circuitry 166 and at least one memory 174, which can include a Dynamic Random Access Memory (DRAM) or other solid-state memory, such as a Storage Class Memory (SCM) used to access data quickly.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, Electrically Erasable Programmable Read-Only Memory (EEPROM), Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferro-electric Memory (FeRAM), Magnetoresistive RAM (MRAM), 3D-XPoint memory, and/or other discrete Non-Volatile Memory (NVM) chips, or any combination thereof.

Circuitry 166 can comprise electronic components for performing different functions for operation of the DSD, such as an interface controller, a Read/Write Integrated Circuit (R/W IC), an AE module, a motor driver, a servo processor, and other digital processors and associated memory. In this regard, circuitry 166 can include one or more processors for executing instructions, such as a micro-controller, a DSP, an Application-Specific Integrated Circuit (ASIC), a Field Programmable Gate Array (FPGA), a Graphics Processing Unit (GPU), hard-wired logic, analog circuitry, and/or a combination thereof. In some implementations, circuitry 166 can include a System on a Chip (SoC), which may also include one or more memories of at least one memory 174.

As shown in FIG. 1, at least one memory 174 stores defect module 10, active Primary defect List (P-List) 12, inactive P-List 14, Grown defect List (G-List) 16, and logical to physical translation table 18 (i.e., L2P translation table 18 in FIG. 1). As discussed above, some sectors on the disks of DSD 100 may be defective or otherwise unable to reliably store data or reliably have data read from the defective sectors due to the manufacturing of the disks. The defective sectors are usually identified by the DSD manufacturer when formatting the disk surfaces of the DSD for storing data and are referred to as "primary defects."

The primary defects are added to active P-List 12 so that the defective sectors are skipped during operation and made unavailable for storing data. In this regard, active P-List 12 can keep the physical locations of the defective sectors from appearing in logical to physical translation table 18, which is used to read and write data logically addressed by a host.

Defective sectors identified after formatting the disk surfaces or during operation of DSD 100 are referred to as "grown defects." The grown defects are added to G-List 16 that is used similarly to active P-List 12 to skip defective sectors during operation. Any data stored in a grown defect sector may be attempted to be relocated to another sector, and logical to physical translation table 18 is updated to remove the grown defect sector's physical location to prevent data from being written to the grown defect sector.

As noted above, the number of sectors on disk surfaces has been increasing to store more data. The greater number of sectors, in addition to a smaller physical size of sectors, has generally caused an increase in the number of grown defects added to G-Lists of DSDs during operation. In conventional systems, the G-List may need to be increased to accommodate a larger number of grown defects. Moving grown defects from the G-List to the P-List is typically not an option in the field for conventional DSDs because merging the G-List into the P-List can usually only be performed via a special formatting command (e.g., a format unit command) that reformats the disk surfaces. Reformatting the disk surfaces can take a very long period of time, such as one or more days, and also reinitializes the logical to physical translation table, which effectively erases all the user data stored on the disk surfaces.

As discussed in more detail below, the present disclosure uses an inactive P-List to facilitate merging the G-List entries into the active P-List as a background activity that enables read and write commands to performed during the merging. In addition, the use of the inactive P-List and the processes discussed below provide a safer way of merging the G-List into the P-List without having to reformat the disks and rely on a backup of the data, which adds complexity and time to the merging by requiring the backup of all data before reformatting and the subsequent restoration of data from the backup.

With reference to FIG. 1, defect module 10 can include computer-executable instructions executed by circuitry 166 for merging entries of G-List 16 into inactive P-List 14 and active P-List 12. Defect module 10 may also include instructions for managing defects, such as creating the entries for the P-Lists and the G-List or mapping out or removing physical addresses from logical to physical translation table 18, for example.

Active P-List 12 can include, for example, entries for Physical Block Addresses (PBAs) or Absolute Block Addresses (ABAs) that identify the locations of primary defect sectors. In this regard, PBAs or ABAs can refer to a sequential addressing of sectors on one or more disk surfaces of DSD 100, regardless of their defective or non-defective states. Although the present disclosure refers to PBAs for ease of description, those of ordinary skill in the art will appreciate that references to PBAs can include ABAs in other implementations.

Inactive P-List 14 can include, in some implementations, the same defective sectors identified in active P-List 12 with additional entries for defective G-List sectors to be added to the active P-List. G-List 16 can include entries for Medium Block Addresses (MBAs) that identify the locations of grown defect sectors, which can be merged or moved from the G-List to the active P-List using the methods and systems of the present disclosure. The MBAs can provide a sequential addressing that skips the defective sectors identified by the active P-List and therefore includes fewer addresses than the PBAs, which include addresses for the defective sectors of the active P-List. In other implementations, G-List 16 may instead include entries for PBAs or ABAs that identify the locations of grown defect sectors as with the P-Lists.

Logical to physical translation table 18 can provide a mapping between logical addresses (e.g., Logical Block Addresses (LBAs)) used by a host in communication with DSD 100 to identify data and the sectors where the data is stored on the disk surfaces. In some implementations, logical to physical translation table 18 can include LBAs and their corresponding MBAs to identify the sectors where data is stored for the LBAs. Logical to physical translation table 18 may be updated based on the addition of grown defects to the G-List and the relocation of data to different sectors.

In the example of FIG. 1, DSD 100 includes Non-Volatile Memory (NVM) 178, which can include a solid-state memory. NVM 178 can optionally store copies of the inactive P-List (i.e., P-List-03 20), the G-List (i.e., G-List 22), the active P-List (i.e., Active P-List 24), and the logical to physical translation table (i.e., L2P Translation Table 28). As shown in FIG. 1, NVM 178 can also include a temporary storage area used for the G-List merging process (i.e., temporary storage area 26). As indicated by their dashed outlines in FIG. 1, one or more of these data structures and/or temporary storage area 26 may alternatively be stored on another non-volatile media of DSD 100, such as on disk 120, for example. In the case of P-List-03 20, a version of the inactive P-List may be non-volatilely stored or check-pointed throughout the G-List merging process and may also indicate a sequence number (e.g., "03" in the example of P-List-03 20 in FIG. 1), which may be used to resume the merging process after an interruption or pause, such as after restarting DSD 100 after a power loss or other type of shutdown of DSD 100.

As will be appreciated by those of ordinary skill in the art with reference to the present disclosure, other implementations of DSD 100 may differ from the example shown in FIG. 1. For example, other implementations of DSD 100 may not include NVM 178 in favor of non-volatilely storing the temporary storage area and copies of the P-Lists, G-List, and logical to physical translation table on one or more disks of DSD 100. As another example variation, some of circuitry 166 may be located outside of controller 170, such as by forming part of AE module 160.

FIGS. 2A to 2F illustrate an example of merging a G-List, such as G-List 16 in FIG. 1, into a P-List, such as active P-List 12 in FIG. 1, according to one or more embodiments. FIGS. 2A to 2F show a sequence of operations that can be performed to merge entries from the G-List into the P-List that uses a set of shifting P-List entries of an inactive version of the P-List (e.g., inactive P-List 14 in FIG. 1) to accept grown defect entries from the G-List beginning with a highest logical address and moving or shifting toward lower logical addresses.

As discussed in more detail below, such merging of the G-List into the P-List limits the changes to the logical to physical translation table (e.g., L2P translation table 18 in FIG. 1) to chunks or groups of logical addresses and physical addresses and enables host commands to continue to be performed during the merging. An active version of the P-List (e.g., active P-List 12 in FIG. 1) can be used by the DSD for performing assignments of logical addresses to physical addresses on the at least one disk during the merge process so as not to interfere with the operation of read and write commands being performed on the least one disk.

Figure 2A:
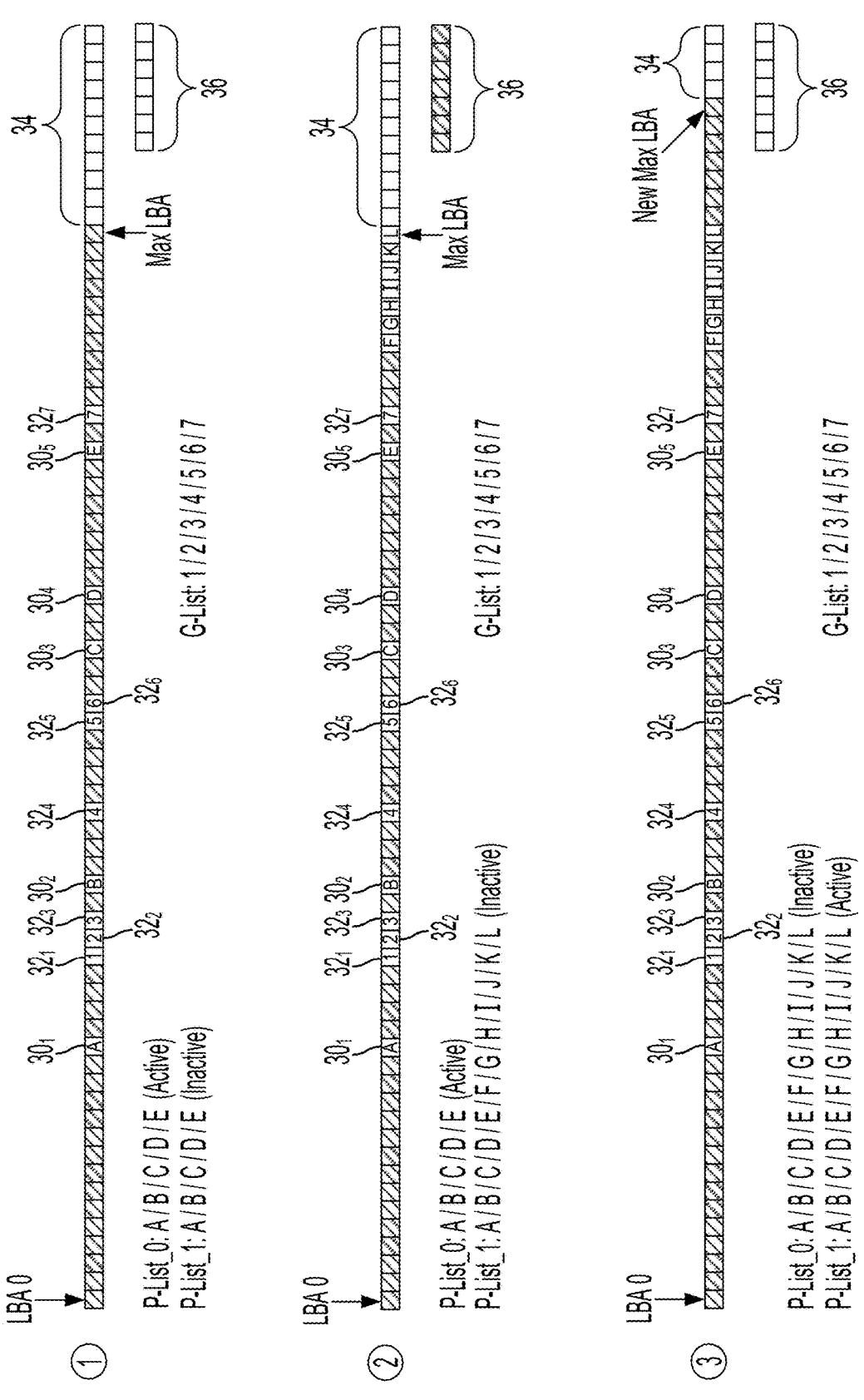
FIGS. 2A, 2B, 2C, 2D, 2E, and 2F illustrate an example of merging a Grown defect List (G-List) into a Primary defect List (P-List) according to one or more embodiments.

As shown in the first step indicated by the circled "1" at the top of FIG. 2A, one or more disk surfaces (e.g., surfaces of disk 120 in FIG. 1) include sectors or blocks that are logically addressed between an LBA of 0 on the left to a max LBA on the right. As indicated by active P-List_0 and inactive P-List_1, the at least one disk surface includes primary defects with entries in both versions of the P-List of A, B, C, D, and E corresponding to primary defect sector locations $30_1$, $30_2$, $30_3$, $30_4$, and $30_5$. The at least one disk surface also includes grown defects with entries in the G-List of 1, 2, 3, 4, 5, 6, and 7 corresponding to grown defect sector locations $32_1$, $32_2$, $32_3$, $32_4$, $32_5$, $32_6$, and $32_7$.

As noted above, the entries in the P-Lists can include PBAs or another type of address or physical locator for identifying the primary defect sectors, such as ABAs. In the example of FIGS. 2A to 2F, the G-List may identify grown defect sectors using MBAs that may skip the primary defect sectors identified in the P-List. In other implementations, the G-List may use PBAs or ABAs as in the P-Lists to identify grown defect sectors without skipping the primary defect sectors.

At an initial stage before any grown defects are added to the P-Lists, the inactive P-List may be a copy of the active P-List. The physical locations indicated by the list entries for the primary defects and the grown defects are shown in the first step of FIG. 2A with the entry identifiers shown on the sectors or blocks as "A", "B", "C", "D", and "E" for the primary defects and "1", "2", "3", "4", "5", "6", and "7" for the grown defects.

Temporary storage area 36 is also shown in FIG. 2A and serves as a temporary storage location for relocating data from sectors to make room for a shifting set of P-List entries. Temporary storage area 36 can be, for example, a portion of the at least one disk not being used or that is otherwise available. In some implementations, temporary storage area 36 can be a part of unused portion 34. In other implementations, temporary storage area 36 can be located in another type of non-volatile memory of the DSD, such as in NVM 178 in the example of FIG. 1 with temporary storage area 26. In such implementations, a separate logical to physical translation table may be used for NVM 178 in addition to the logical to physical translation table used for the at least one disk.

In the second step indicated by the circled "2" in FIG. 2A, the data stored in a predetermined number of sectors addressed with the highest logical addresses (i.e., the seven sectors assigned the highest LBAs in FIG. 2A) is relocated to temporary storage area 36. The relocation of data is indicated in the second step by the cross-hatching of the blocks moving from the first set of sectors to temporary storage area 36. The logical addresses assigned to the first set of sectors are temporarily reassigned in the logical to physical translation table with the physical locations or addresses (e.g., MBAs) of the sectors or blocks in temporary storage area 36.

The sectors that are freed or made available by reassigning the logical addresses for the set of sectors are associated with a set of shifting P-List entries (i.e., inactive P-List entries "F", "G", "H", "I", "J", "K", and "L" in the second step) that are added to the currently inactive version of the P-List, P-List_1, to absorb or accept entries for the grown defects from the G-List. The predetermined number of logical addresses reassigned to temporary storage area 36 (i.e., for seven sectors in the example of FIG. 2A) is equal to an initial number of entries in the G-List (i.e., the seven G-List entries in FIG. 2A). In this regard, the predetermined number of logical addresses reassigned corresponds to an initial number of shifting P-List entries and can be equal to or less than the total initial number of G-List entries. In implementations where the predetermined number of logical addresses reassigned or initial number of shifting P-List entries is less than the full initial number of G-List entries, the P-List only accepts or absorbs a portion of the entries of the G-List equal to the predetermined number.

As shown in the second step of FIG. 2A, the inactive P-List is increased by adding the seven new entries for the set of shifting P-List entries of "F", "G", "H", "I", "J", "K", and "L" to inactive P-List_1. In some implementations, a copy of the inactive P-List (P-List_1) may be checkpointed or non-volatilely stored. A sequence number for the checkpointed inactive P-List may also be incremented (e.g., from "0" to "1") to keep track of the progress of the G-List merging process in case of an interruption or pause in the merging process.

In the third step of FIG. 2A, the logical addresses having the highest logical addresses are reassigned from temporary storage area 36 to unused portion 34 of the at least one disk. The size of unused portion 34 decreases by the seven sectors or blocks that now store data as a result of reassigning the logical addresses. At this point, the logical to physical translation table is again updated to reflect the new physical locations for the reassigned logical addresses. As will be shown in the following steps, the relocation of data from sets of sectors to temporary storage area 36 facilitates the shifting of the set of shifting P-List entries.

The roles of P-List_0 and P-List_1 switch in the third step, with P-List_1 being designated as a new active version of the P-List, and P-List_0 being designated as a new inactive version of the P-List. The switching between active and inactive versions of the P-List can enable piecemeal or successive changes to the P-List without affecting the operation of read and write commands, since changes that may be needed to the logical to physical translation table for performing the commands can rely on the active version of the P-List. After switching roles, the new inactive P-List (P-List_0) is updated to add the shifting P-List entries of "F", "G", "H", "I", "J", "K", and "L" in the third step. An existing checkpointed copy of the old active P-List (P-List_0) (e.g., active P-List 24 in FIG. 1) may also be updated with a copy of the new active P-List (P-List_1). As noted above for the second step, a copy of the old inactive P-List (P-List_1) may have been checkpointed or non-volatilely stored before P-List_1 is designated as the new active P-List to track or save the progress of the G-List merging process. The inactive and active versions of the P-List are the same in the third step of the example of FIG. 2A.

Figure 2B:
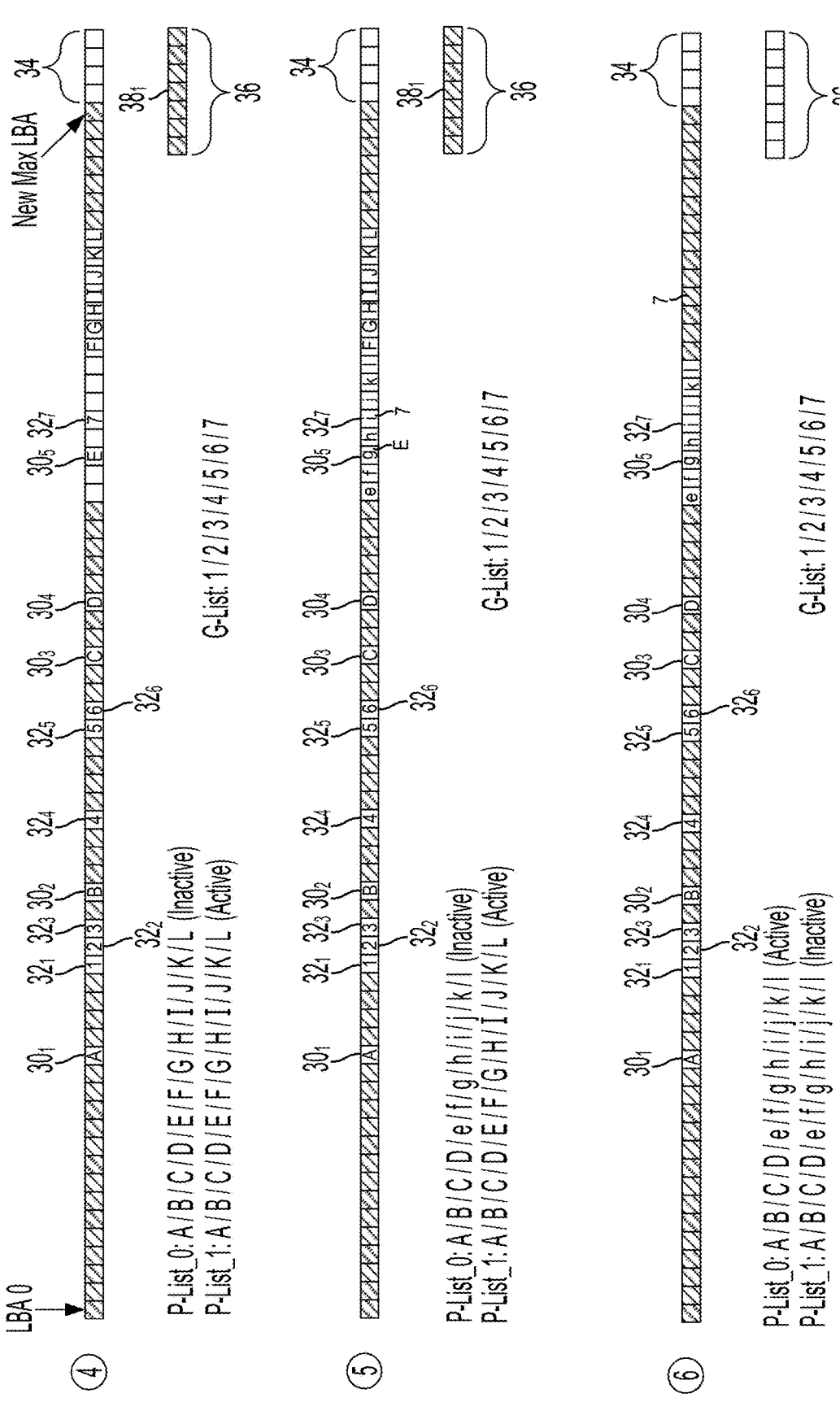

In the fourth step shown in FIG. 2B, a next descending set of logical addresses (e.g., from higher LBAs to lower LBAs) are reassigned from a next or successive set of sectors to temporary storage area 36 to make room for the shifting P-List entries to shift or move down to the next set of sectors on the at least one disk. This time, the set of sectors corresponding to the reassigned logical addresses includes grown defect sector location $32_7$, which is identified by entry "7" in the G-List. The data for this grown defect sector may have already been reassigned to another sector or block in a different location as part of a grown defect handling process. In the example of FIG. 2B, the data for this grown defect sector is relocated to block or sector location 381 in temporary storage area 36. In other implementations, the reassigned data may remain in its non-defect location rather than relocating the data for the grown defect sector to block or sector location 381.

In the fifth step shown in FIG. 2B, the set of shifting P-List entries are shifted or moved down to the next seven sectors that have been freed or made available by reassigning the logical addresses and relocating the associated data to temporary storage area 36. As shown in the fifth step, the shifting P-List entries of the currently inactive P-List (P-List_0) are designated with lowercase letters "e", "f", "h", "i", "j", "k", and "l" to distinguish them from the same-letter uppercase entries "E", "F", "H", "I", "J", "K", and "L" of the currently active P-List (P-List_1). Notably, the entry for "g" in the inactive P-List has been reallocated from the previous "E" entry of the active P-List for primary defect location $30_5$ and does not consume or reduce the number of shifting P-List entries, since an entry of the P-List was already allocated to this location. A copy of updated inactive P-List (P-List_0) may be checkpointed or non-volatilely stored to track or save the progress of the G-List merging process and/or a sequence number for the inactive P-List may also be incremented.

A next set of sectors corresponding to a descending set of logical addresses that have been reassigned are reserved for the shifting P-List entries of the inactive P-List by moving or shifting the shifting P-List entries to lower logical addresses (i.e., to the left in FIG. 2B) until reaching the first available sector freed by the reassignment of logical addresses and the associated relocation of data. The new locations for the set of shifting P-List entries span a primary defect location $30_5$ and a grown defect location $32_7$. Entry "g" of the shifting P-List entries indicates the primary defect location $30_5$ in the inactive P-List, while entry "E" of the active P-List indicates the primary defect location $30_5$. Entry "i" of the shifting P-List entries indicates the grown defect location $32_7$ in the inactive P-List while entry "7" of the G-List indicates the grown defect location $32_7$.

The entries of the active P-List do not change their locations in the fifth step. This causes the locations indicated by "F", "G", "H", "I", "J", "K", and "L" to remain temporarily unavailable for being assigned new logical addresses (e.g., logical addresses added by the host or existing logical addresses being reassigned from a different location) even though these locations may otherwise be non-defective. However, the impact of this temporary unavailability is limited by the size of the predetermined number of shifting P-List entries. In this regard, the impact of this temporary effect may be balanced against the number of G-List entries to be added to the P-List in determining the predetermined number of shifting P-List entries.

The roles of P-List_0 and P-List_1 switch again in the sixth step, with P-List_0 being designated as a new active version of the P-List, and P-List_1 being designated as a new inactive version of the P-List. The new inactive P-List (P-List_1) is updated to add the P-List entries of "e", "f", "g", "h", "i", "j", "k", and "l" in the sixth step. An existing checkpointed copy of the old active P-List (P-List_1) may also be updated with a copy of the new active P-List (P-List_0). The inactive and active versions of the P-List are now the same in the sixth step. As shown in the sixth step, the entry "7" in the G-List is temporarily shifted seven sectors or blocks to the right because the G-List in this example uses MBAs or an addressing that skips defective sectors, and the shifting P-List entries displace the entry of the G-List when P-List_0 is made active by the seven sectors of the shifting P-List entries.

In addition, the logical addresses assigned to temporary storage area 36 are reassigned back to non-defect sectors of the at least one disk that have been made available by shifting the set of P-List entries or removing previous entries from the active P-List. The data stored in temporary storage area 36 is relocated back to the sectors that have been made available and correspond to the reassigned logical addresses. This makes temporary storage area 36 available again for a next descending set of reassigned logical addresses and corresponding relocated data. The logical to physical translation table is updated to associate the reassigned logical addresses with their new physical locations (e.g., MBAs) on the at least one disk.

Figure 2C:
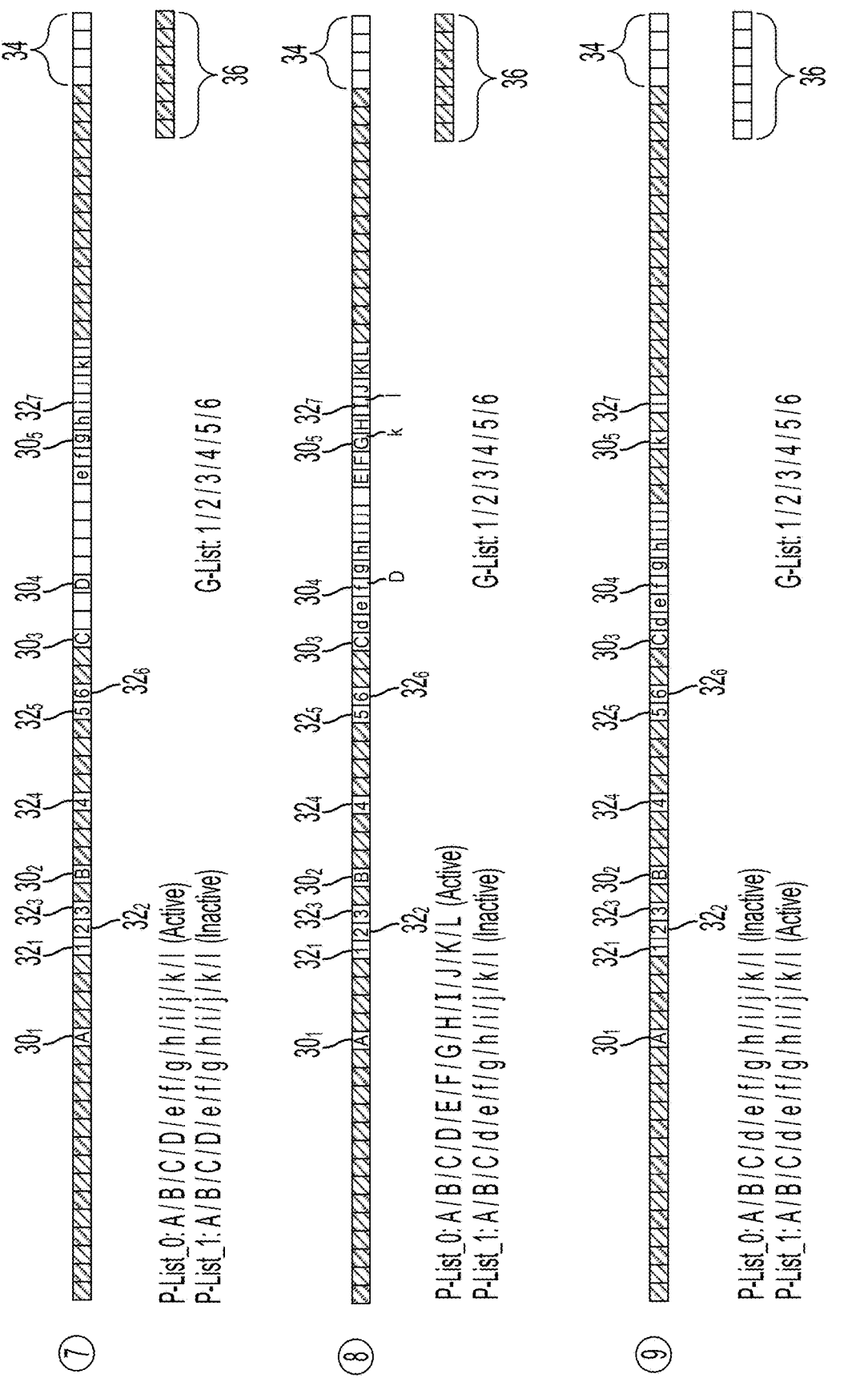

In the seventh step of FIG. 2C, the next seven descending logical addresses have been reassigned from sectors on the at least one disk to temporary storage area 36. The associated data for the logical addresses has also been relocated to corresponding sectors or blocks of temporary storage area 36.

Notably, the "7" entry is removed from the G-List, since the grown defect sector location $32_7$ now has an entry "i" in the active P-List. In other implementations, the entries of the G-List may not be removed from the G-List until all of the entries of the shifting P-List entries have been filled, as opposed to updating the G-List as entries of the shifting P-List entries are retained or filled by grown defect locations. However, such implementations may incorrectly indicate that certain non-defect sectors have grown defects during the merge process due to the offset caused by a physical addressing scheme that skips primary defect sectors.

In the eighth step, the shifting P-List entries are shifted again in a next iteration to the left to cover the sectors or blocks made available by reassigning the set of descending logical addresses to temporary storage area 36. A next set of sectors corresponding to a descending set of logical addresses that have been reassigned is reserved for the shifting P-List entries of the inactive P-List by moving or shifting the shifting P-List entries to lower logical addresses until reaching the first available sector freed by the reassignment of logical addresses and the associated relocation of data.

The new locations for the set of shifting P-List entries span a primary defect location $30_4$ but do not include any grown defect locations. As shown in the eighth step, P-List entries of the currently active P-List (P-List_0) are designated with uppercase letters "D", "E", "F", "G", "H", "I", "J", "K", and "L" to distinguish them from the same-letter lowercase entries of the currently inactive P-List (P-List_1). A copy of updated inactive P-List (P-List_1) may be checkpointed or non-volatilely stored to track or save the progress of the G-List merging process and/or a sequence number for the inactive P-List may also be incremented.

The entry "f" in the inactive P-List is allocated to primary defect location $30_4$, and the entry "D" in the active P-List remains allocated to primary defect location $30_4$. Similarly, primary defect location $30_5$ is reassigned from the "g" entry in the inactive P-List to the "k" entry in the inactive P-List as a result of the shifting of the shifting P-List entries. In this regard, the entries of the inactive P-List in the examples of FIGS. 2A to 2F sequentially identify the locations of the defective sectors, and the previously identified defects retain entries in the inactive P-List. The primary defect location $30_5$ in the eighth step remains assigned to the "G" entry in the active P-List, which is now shown as an upper-case letter to distinguish from the same-letter entries of the inactive P-List.

The grown defect location $32_7$ retains an entry in the inactive P-List despite the shifting the P-List entries but is reassigned the "I" entry of the inactive P-List due to the shifting. As shown in the eighth step, the grown defect location $32_7$ retains its "I" entry in the active P-List, which is shown as an upper-case letter to distinguish from the "i" entry of the inactive P-List. In this regard, one of the shifting P-List entries has been filled by the grown defect location $32_7$, so the set of shifting P-List entries has been reduced by one entry for a new total of six shifting P-List entries following the eighth step. The shifting P-List entries after the eighth step are the "d", "e", "g", "h", "i", and "j" entries of the inactive P-List.

The roles of P-List_0 and P-List_1 switch again in the ninth step, with P-List_1 being designated as a new active version of the P-List, and P-List_0 being designated as a new inactive version of the P-List. The new inactive P-List (P-List_0) is updated to match the previous inactive P-List (P-List_1). An existing checkpointed copy of the old active P-List (P-List_0) may also be updated with a copy of the new active P-List (P-List_1).

In addition, the logical addresses assigned to temporary storage area 36 are reassigned back to non-defect sectors of the at least one disk that have been made available by shifting the set of P-List entries or removing previous entries from the active P-List. The data stored in temporary storage area 36 is relocated back to the sectors that have been made available and correspond to the reassigned logical addresses.

This makes temporary storage area 36 available again for a next descending set of reassigned logical addresses and corresponding relocated data. The logical to physical translation table is updated to associate the reassigned logical addresses with their new physical locations (e.g., MBAs) on the at least one disk.

Figure 2D:
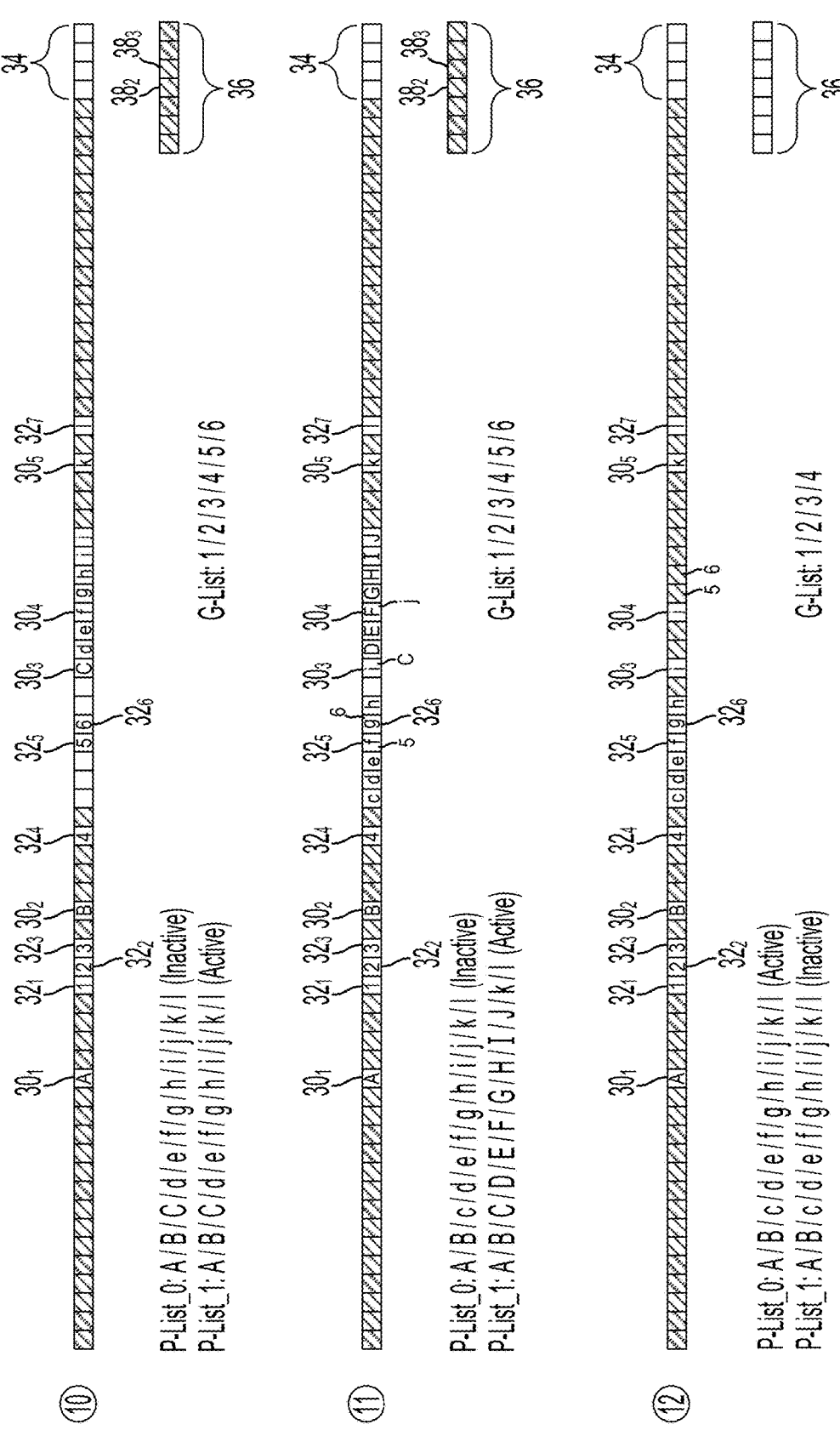

In the tenth step of FIG. 2D, the next descending set of seven logical addresses is reassigned from the at least one disk to temporary storage area 36 including relocating the associated data to temporary storage area 36. Two of the reassigned logical addresses are for grown defect sectors $32_5$ and $32_6$ as indicated by sector or block locations $38_2$ and $38_3$ in storage area 36. The logical addresses for these grown defect sectors may have already been reassigned to other non-defect sectors as part of a grown defect handling process, and the logical addresses may be reassigned from these other non-defect sectors to temporary storage area 36. The associated data may also be relocated from the other non-defect sectors to temporary storage area 36. In other implementations, the logical addresses may remain assigned to the other non-defect sectors, and the data may remain stored in the non-defect sectors without reassigning the logical addresses and relocating the data to temporary storage area 36.

In the eleventh step, the shifting P-List entries are shifted again in a next iteration to the left to cover at least part of the sectors or blocks made available by reassigning the set of descending logical addresses to temporary storage area 36. A next set of sectors corresponding to a descending set of logical addresses that have been reassigned are reserved for the six shifting P-List entries of the inactive P-List by moving or shifting the shifting P-List entries to lower logical addresses until reaching the first available sector freed by the reassignment of logical addresses and the associated relocation of data while filling entries of the shifting P-List entries with grown defect locations encountered during the shifting.

The new locations for the set of shifting P-List entries span two grown defect locations $32_5$ and $32_6$ but do not include any primary defect locations. As shown in the eleventh step, P-List entries of the currently active P-List (P-List_1) are designated with uppercase letters "C", "D", "E", "F", "G", "H", "I", and "J" to distinguish them from the same-letter lowercase entries of the currently inactive P-List (P-List_0). A copy of updated inactive P-List (P-List_0) may be checkpointed or non-volatilely stored to track or save the progress of the G-List merging process and/or a sequence number for the inactive P-List may also be incremented.

Entries of the inactive P-List are retained for the primary defects $30_3$, $30_4$, and $30_5$, and for the grown defect $32_7$. The grown defects $32_5$ and $32_6$ are assigned inactive P-List entries "f" and "g", respectively, and the inactive P-List entries for primary defects $30_3$ and $30_4$ are shifted to inactive P-List entries "i" and "j", respectively. Two additional entries of the shifting P-List entries have been filled by the grown defect locations $32_5$ and $32_6$, so the set of shifting P-List entries has been reduced by two more entries for a new total of four shifting P-List entries following the eleventh step. The remaining shifting P-List entries after the eleventh step are the "c", "d", "e", and "h" entries of the inactive P-List.

The roles of P-List_0 and P-List_1 switch again in the twelfth step, with P-List_0 being designated as a new active version of the P-List, and P-List_1 being designated as a new inactive version of the P-List. The new inactive P-List (P-List_1) is updated to match the previous inactive P-List (P-List_0). An existing checkpointed copy of the old active P-List (P-List_1) may also be updated with a copy of the new active P-List (P-List_0).

In addition, the logical addresses assigned to temporary storage area 36 are reassigned back to non-defect sectors of the at least one disk that have been made available by shifting the set of P-List entries or removing previous entries from the active P-List. The data stored in temporary storage area 36 is relocated back to the sectors that have been made available and correspond to the reassigned logical addresses. This makes temporary storage area 36 available again for a next descending set of reassigned logical addresses and corresponding relocated data. The logical to physical translation table is updated to associate the reassigned logical addresses with their new physical locations (e.g., MBAs) on the at least one disk. As shown in the twelfth step, the entries "5" and "6" in the G-List are each temporarily shifted eight sectors or blocks to the right because the G-List in this example uses MBAs or an addressing that skips defective sectors, and the shifting P-List entries displace these entries of the G-List when P-List_0 is made active.

In implementations where data is not relocated to temporary storage area 36 for grown defect locations $32_5$ and $32_6$ in the eleventh step discussed above, the data for these logical addresses may instead be relocated from their reassigned locations on the at least one disk. In such implementations, the logical addresses for these reassigned locations would remain in the reassigned locations instead of being relocated to temporary storage area 36 until the other data is relocated from temporary storage area 36 back to non-defect sectors in the twelfth step. Notably, the G-List is shortened to remove entries of "5" and "6" for grown defects $32_5$ and $32_6$, since entries for these grown defect locations have been added to the active P-List.

Figure 2E:
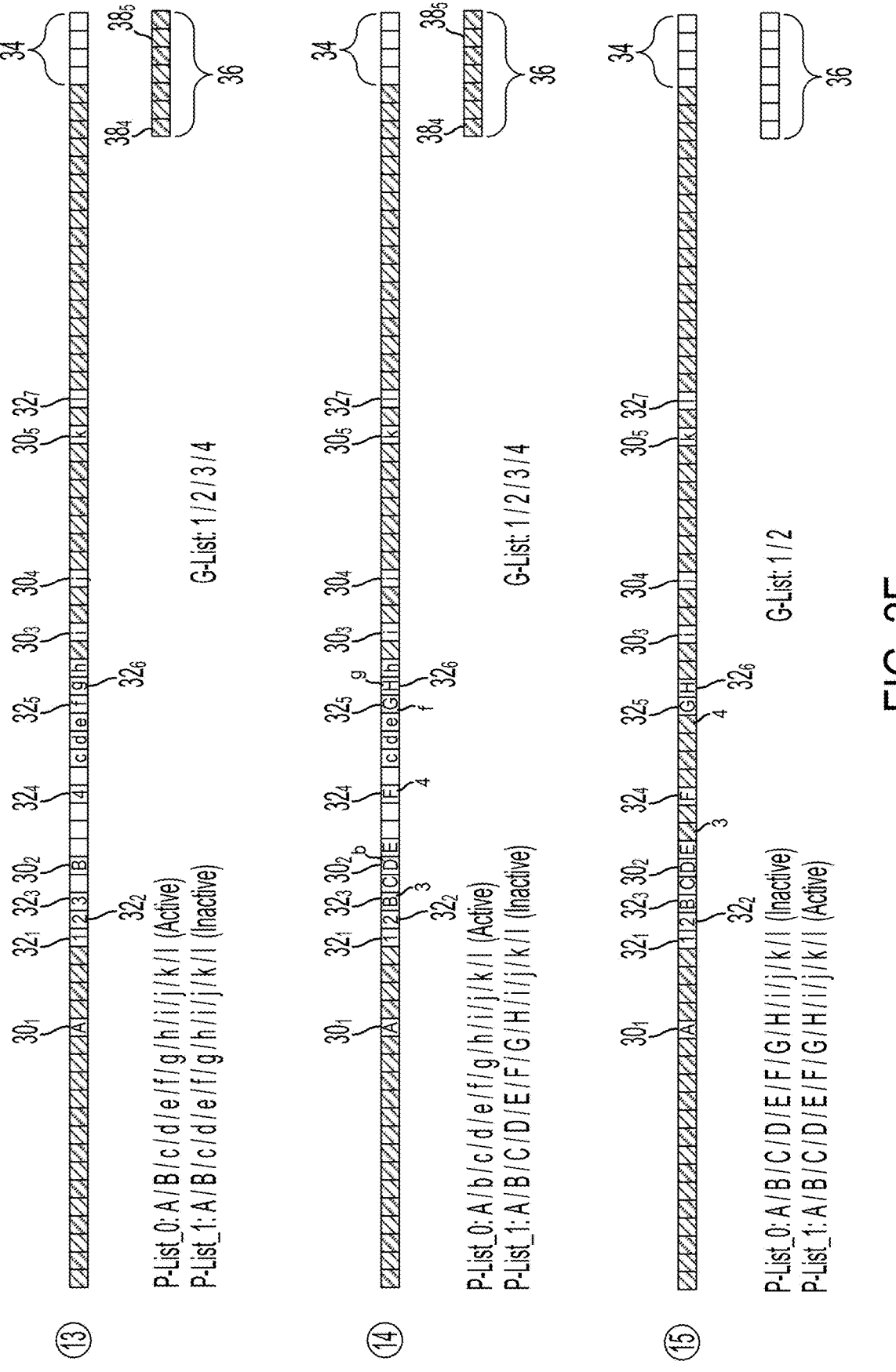

In the thirteenth step of FIG. 2E, the next descending set of seven logical addresses is reassigned from the at least one disk to temporary storage area 36 including relocating the associated data to temporary storage area 36. Two of the reassigned logical addresses are for grown defect sector locations $32_3$ and $32_4$ as indicated by sectors or block locations $38_4$ and $38_5$ in storage area 36. The logical addresses for these grown defect sectors may have already been reassigned to other non-defect sectors as part of a grown defect handling process, and the logical addresses may be reassigned from these other non-defect sectors to temporary storage area 36. The associated data may also be relocated from the other non-defect sectors to temporary storage area 36. In other implementations, the logical addresses may remain assigned to the other non-defect sectors, and the data may remain stored in the non-defect sectors without reassigning the logical addresses and relocating the data to temporary storage area 36. No data is relocated to temporary storage area 36 for primary defect sector location $30_2$, since this location was mapped out during an initial formatting of the at least one disk, and data would not have been subsequently stored in this primary defect location.

In the fourteenth step, the shifting P-List entries are shifted again in a next iteration to the left to cover at least part of the sectors or blocks made available by reassigning the set of descending logical addresses to temporary storage area 36. A next set of sectors corresponding to a descending set of logical addresses that have been reassigned is reserved for the four shifting P-List entries of the inactive P-List by moving or shifting the shifting P-List entries to lower logical addresses until reaching the first available sector freed by the reassignment of logical addresses and the associated relocation of data while filling entries of the shifting P-List entries with grown defect locations encountered while shifting the entries.

Grown defect locations $32_5$, $32_6$, and $32_7$ and primary defect locations $30_3$, $30_4$, and $30_5$ retain entries in the inactive P-List. In this regard, grown defect locations $32_5$ and $32_6$ are reassigned inactive P-List entries "G" and "H" due to the shifting P-List entries, and grown defect location $32_7$ retains its P-List entry of "I". Primary defect locations $30_3$, $30_4$, and $30_5$ retain entries "i", "j", and "k" in the inactive P-List. Notably, grown defect location $32_3$ has been assigned shifting P-List entry "B" of the inactive P-List.

As shown in the fourteenth step, P-List entries of the currently inactive P-List (P-List_1) are designated with uppercase letters "C", "D", "E", "F", "G", and "H" to distinguish them from the same-letter lowercase entries of the currently active P-List (P-List_0), and the active P-List entry for "b" is designated as lowercase to distinguish from the uppercase "B" entry of the inactive P-List. A copy of the updated inactive P-List (P-List_1) may be checkpointed or non-volatilely stored to track or save the progress of the G-List merging process and/or a sequence number for the inactive P-List may also be incremented.

The roles of P-List_0 and P-List_1 switch again in the fifteenth step, with P-List_0 being designated as a new inactive version of the P-List, and P-List_1 being designated as a new active version of the P-List. The new inactive P-List (P-List_0) is updated to match the previous inactive P-List (P-List_1). An existing checkpointed copy of the old active P-List (P-List_0) may also be updated with a copy of the new active P-List (P-List_1).

In addition, the logical addresses assigned to temporary storage area 36 are reassigned back to non-defect sectors of the at least one disk that have been made available by shifting the set of P-List entries or removing previous entries from the active P-List. The data stored in temporary storage area 36 is relocated back to the sectors that have been made available and correspond to the reassigned logical addresses. This makes temporary storage area 36 available again for a next descending set of reassigned logical addresses and corresponding relocated data. The logical to physical translation table is updated to associate the reassigned logical addresses with their new physical locations (e.g., MBAs) on the at least one disk. As shown in the fifteenth step, the entries "3" and "4" in the G-List are each temporarily shifted four sectors or blocks to the right because the G-List in this example uses MBAs or an addressing that skips defective sectors, and the shifting P-List entries (with the exception of an entry for the previously existing P-List entry for primary defect location $30_2$) displace the entries of the G-List when P-List_1 is made active.

In implementations where data is not relocated to temporary storage area 36 for grown defect locations $32_3$ and $32_4$ in the thirteenth step discussed above, the data for these logical addresses may instead be relocated from their reassigned locations on the at least one disk. Notably, the G-List is shortened to remove entries of "3" and "4" for grown defects $32_3$ and $32_4$, since entries for these grown defect locations have been added to the active P-List.

Figure 2F:
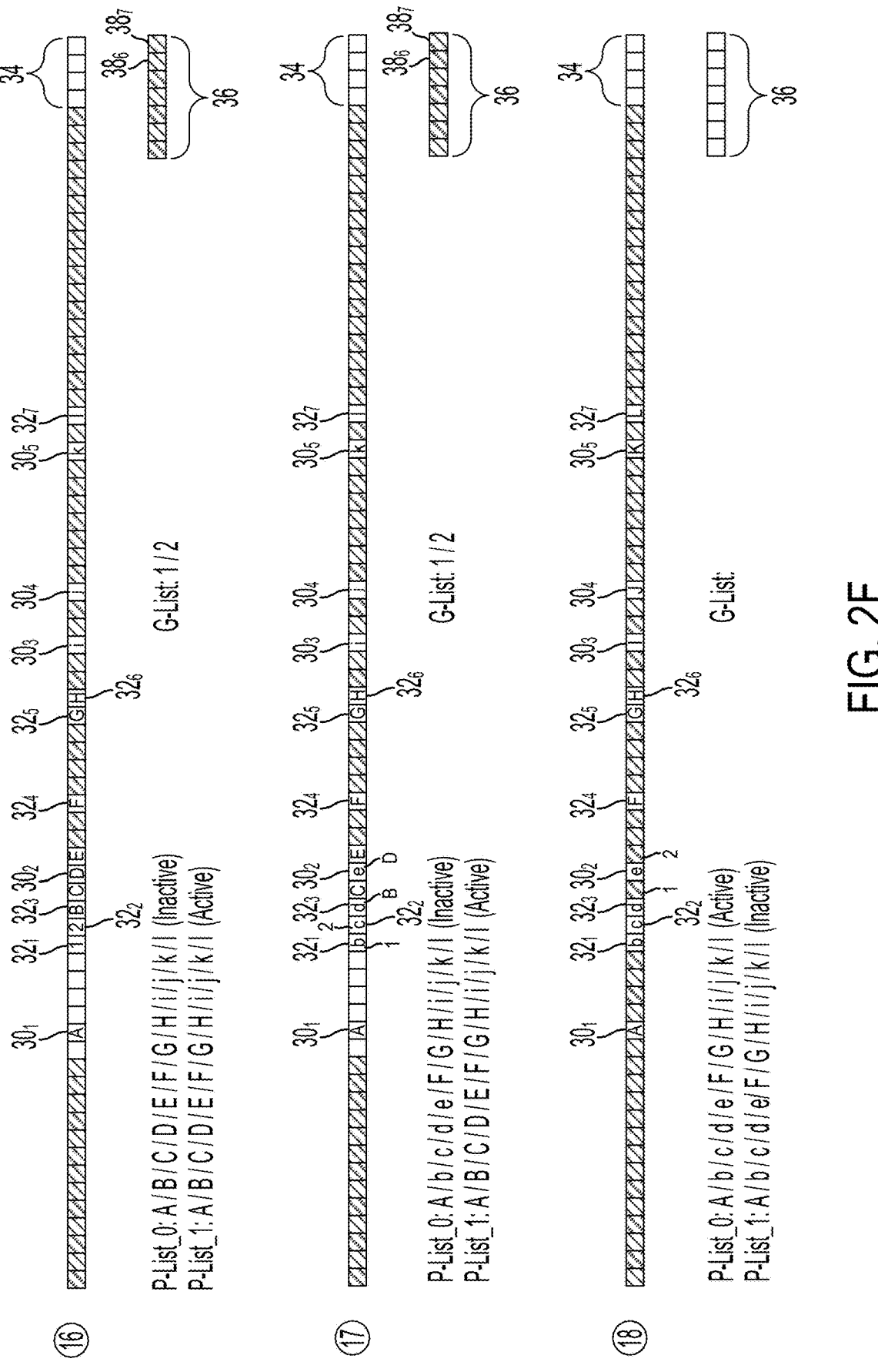

In the sixteenth step of FIG. 2F, the next descending set of seven logical addresses is reassigned from the at least one disk to temporary storage area 36 including relocating the associated data to temporary storage area 36. Two of the reassigned logical addresses are for grown defect sector locations $32_1$ and $32_2$ as indicated by sectors or block locations 386 and 387 in storage area 36. As noted above, the logical addresses for these grown defect sectors may have already been reassigned to other non-defect sectors as part of a grown defect handling process, and the logical addresses may be reassigned from these other non-defect sectors to temporary storage area 36. The associated data may also be relocated from the other non-defect sectors to temporary storage area 36. In other implementations, the logical addresses may remain assigned to the other non-defect sectors, and the data may remain stored in the non-defect sectors without reassigning the logical addresses and relocating the data to temporary storage area 36. No data is relocated to temporary storage area 36 for primary defect sector location $30_1$, since this location was mapped out during an initial formatting of the at least one disk, and data would not have been subsequently stored in this primary defect location.

In the seventeenth step, the shifting P-List entries are shifted again in a next iteration to the left to cover at least part of the sectors or blocks made available by reassigning the set of descending logical addresses to temporary storage area 36. A next set of sectors corresponding to a descending set of logical addresses that have been reassigned are reserved for the remaining two shifting P-List entries of the inactive P-List by moving or shifting the shifting P-List entries to lower logical addresses and filling grown defect locations along the way.

As shown in the seventeenth step, P-List entries of the currently inactive P-List, P-List_0, are designated with lowercase letters "b", "c", "d", and "e" to distinguish them from the same-letter uppercase entries of the currently active P-List, P-List_1. A copy of the updated inactive P-List, P-List_0, may be checkpointed or non-volatilely stored to track or save the progress of the G-List merging process and/or a sequence number for the inactive P-List may also be incremented.

The roles of P-List_0 and P-List_1 switch again in the eighteenth step, with P-List_1 being designated as a new inactive version of the P-List, and P-List_0 being designated as a new active version of the P-List. An existing checkpointed copy of the old active P-List (P-List_1) may also be updated with a copy of the new active P-List (P-List_0).

In addition, the logical addresses assigned to temporary storage area 36 are reassigned back to non-defect sectors of the at least one disk that have been made available by shifting the set of P-List entries or removing previous entries from the active P-List. The data stored in temporary storage area 36 is relocated back to the sectors that have been made available and correspond to the reassigned logical addresses. The logical to physical translation table is updated to associate the reassigned logical addresses with their new physical locations (e.g., MBAs) on the at least one disk. As shown in the eighteenth step, the entries "1" and "2" in the G-List are each temporarily shifted to the right because the remaining two shifting P-List entries displace the entries of the G-List when P-List_0 is made active.

In implementations where data is not relocated to temporary storage area 36 for grown defect locations $32_1$ and $32_2$ in the sixteenth step discussed above, the data for these logical addresses may instead be relocated from their reassigned locations on the at least one disk. Following the eighteenth step, the G-List is shortened to remove entries of "1" and "2" for grown defects $32_1$ and $32_2$, since entries for these grown defect locations have been added to the active P-List.

With the merging of all the entries of the G-List into the active P-List, the merge process may end, and the new active P-List (P-List_0) may continue to be used in operation, such as for assigning new logical addresses to physical addresses in the logical to physical translation table or determining a physical location on the at least one disk for reassigning a logical address, such as when performing a garbage collection process to reclaim sectors storing obsolete data.

The new inactive P-List (P-List_1) may optionally be updated to match the previous inactive P-List (P-List_0) in some implementations. However, since the final iteration of shifting the set of shifting P-List entries has been completed, the new inactive P-List does not need to be updated. In this regard, the new inactive P-List (P-List_1) may be deleted after completion of the G-List merging process in some implementations. In other implementations, the new inactive P-List may be kept for a future round of the G-List merging process to merge additional G-List entries into the P-List. In such implementations, the new inactive P-List may optionally be updated in preparation for the next round of the G-List merging process, which may be performed for newly found grown defects and/or additional grown defects that were not merged in the previous round of the G-List merging process.

In this regard, the merging of the G-List entries into the P-List may be performed in stages corresponding to a predetermined number of shifting P-List entries, such as for one thousand entries at a time. In such cases, the resumption of the background merging of entries from the G-List into the P-List may occur after a certain amount of time or after a certain amount of new grown defects are discovered and added to the G-List, for example.

Along these lines, the G-List merging process may be performed only for one or more particular sections of the physical address range that have more than a threshold number of grown defects. In such implementations, the physical address range (e.g., PBAs) can be divided into sections or the G-List may be divided into sections so that the G-List merging process is only performed for the section or sections with the most grown defects. This can allow for more G-List entries to be merged into the P-List in a shorter period of time, since grown defects may be unevenly distributed across the physical address range or concentrated in particular sections of the at least one disk. In such implementations, each section may have its own unused portion and/or temporary storage area, or the sections may share an unused portion and/or temporary storage area.

Those of ordinary skill in the art will appreciate with reference to the present disclosure that the example of FIGS. 2A to 2F is for the purposes of illustration and that implementations merging a G-List into a P-List may differ in practice. For example, other implementations may wait until filling all the shifting P-List entries with grown defect locations in the eighteenth step before removing any entries from the G-List. In addition, those of ordinary skill in the art will appreciate that G-Lists in practice can include thousands of entries for grown defect sector locations and that the number of shifting P-List entries may be, for example, on the order of thousands of entries.

Figure 3:
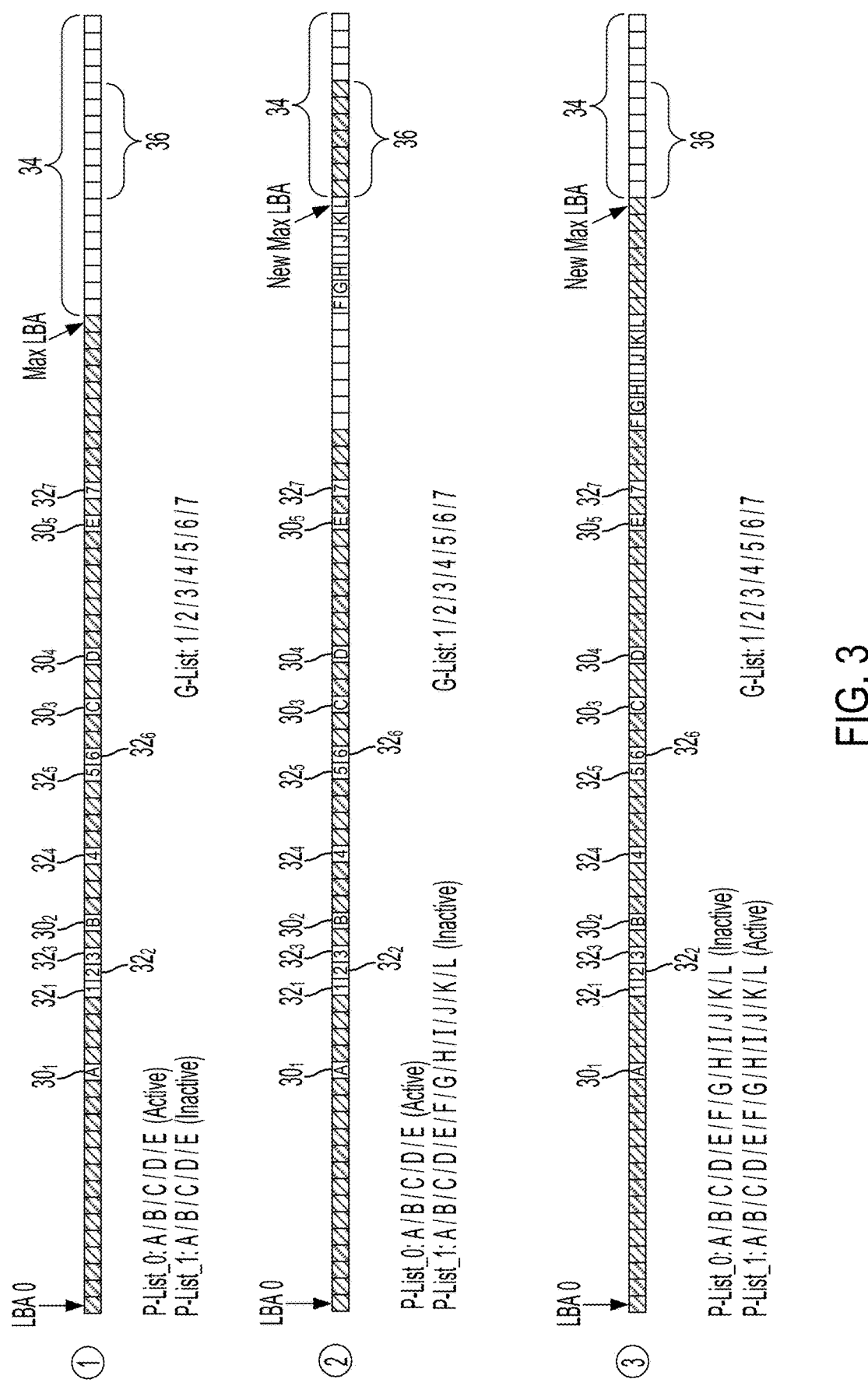
FIG. 3 illustrates an initial variation to the example of FIGS. 2A to 2F in merging the G-List into the P-List according to one or more embodiments.

FIG. 3 provides a variation to the beginning of the example discussed above for FIGS. 2A to 2F. The example of FIG. 3 differs in that the set of shifting P-List entries is instead initially assigned to a part of unused portion 34 such that the reassignment of the logical addresses having the highest logical addresses to temporary storage area 36 frees space for the set of shifting P-List entries to shift or move to the left to lower logical address values. Another difference is that temporary storage area 36 is shown as part of unused portion 34, which, as noted above, could also be implemented for the example of FIGS. 2A to 2F.

As shown in the first step of FIG. 3 indicated by the circled "1", temporary storage area 36 occupies a portion of unused area 34. The primary defects identified by entries "A", "B", "C", "D", and "E" remain the same as in the example of FIG. 2A with primary defect sector locations $30_1$, $30_2$, $30_3$, $30_4$, and $30_5$. The grown defects identified by entries "1", "2", "3", "4", "5", "6", and "7" remain the same as in the example of FIG. 2A with grown defect sector locations $32_1$, $32_2$, $32_3$, $32_4$, $32_5$, $32_6$, and $32_7$.

As shown in the second step of FIG. 3, the set of shifting P-List entries "F", "G", "H", "I", "J", "K", and "L" are added to unused portion 34, which increases the max LBA to a new max LBA and reduces the size of unused portion 34. The first set of descending logical addresses is reassigned to temporary storage area 36 to make room for the set of shifting P-List entries to shift or move to the left. In addition, any data associated with the reassigned logical addresses is relocated to temporary storage area 36. The logical to physical translation table (e.g., logical to physical translation table 18 in FIG. 1) is updated to account for the new physical locations (e.g., updated MBAs) for the reassigned logical addresses. As with the example discussed above for FIGS. 2A to 2F, the example of FIG. 3 includes successively reassigning descending sets of logical addresses from respective sets of sectors to temporary storage area 36 and successively reserving at least a portion of the respective sets of sectors for the set of shifting P-List entries, which is performed in iterations until the shifting P-List entries are filled.

In the third step of FIG. 3, the first descending set of logical addresses is again reassigned from temporary storage area 36 back to the usable area of the at least one disk. The logical addresses are reassigned to the sectors previously reserved for the set of shifting P-List entries that have been made available by shifting the set of P-List entries. Any data associated with the reassigned logical addresses is relocated from temporary storage area 36 to the new locations. The logical to physical translation table is also updated at this time to reflect the new locations for the reassigned logical addresses. As with the example discussed above for FIGS. 2A to 2F, the example of FIG. 3 includes successively reassigning the descending sets of logical addresses from temporary storage area 36 back to non-defect sectors made available after shifting the set of shifting P-List entries performed in iterations until the shifting P-List entries are filled.

After reassigning the logical addresses back from temporary storage area 36, the next descending set of logical addresses can be reassigned to temporary storage area 36 to make room for the set of shifting P-List entries to move to the left (i.e., in a direction of lower logical addresses) to fill the first shifting P-List entry for the grown defect location $32_7$ occupying the "7" entry in the G-List in the third step. The rest of the example of FIG. 3 can continue similar to the example of FIGS. 2A to 2F by continuing with iterations of reassigning a descending set of logical addresses to temporary storage area 36, reserving the set of sectors made available by reassigning the set of logical addresses for the set of shifting P-List entries (i.e., shifting the set of shifting P-List entries), and reassigning the descending set of logical addresses back from temporary storage area 36 to non-defect sectors made available by shifting the set of shifting P-List entries.

Those of ordinary skill in the art will appreciate with reference to the present disclosure that the example of FIG. 3 is for the purposes of illustration and that implementations merging a G-List into an inactive P-List may differ in practice. For example, the physical location of temporary storage area 36 may not immediately follow the new maximum logical address location and may instead be located in a different portion of unused area 36 or in a different non-volatile storage location of the DSD, such as in a solid-state memory.

Example Processes

Figure 4A:
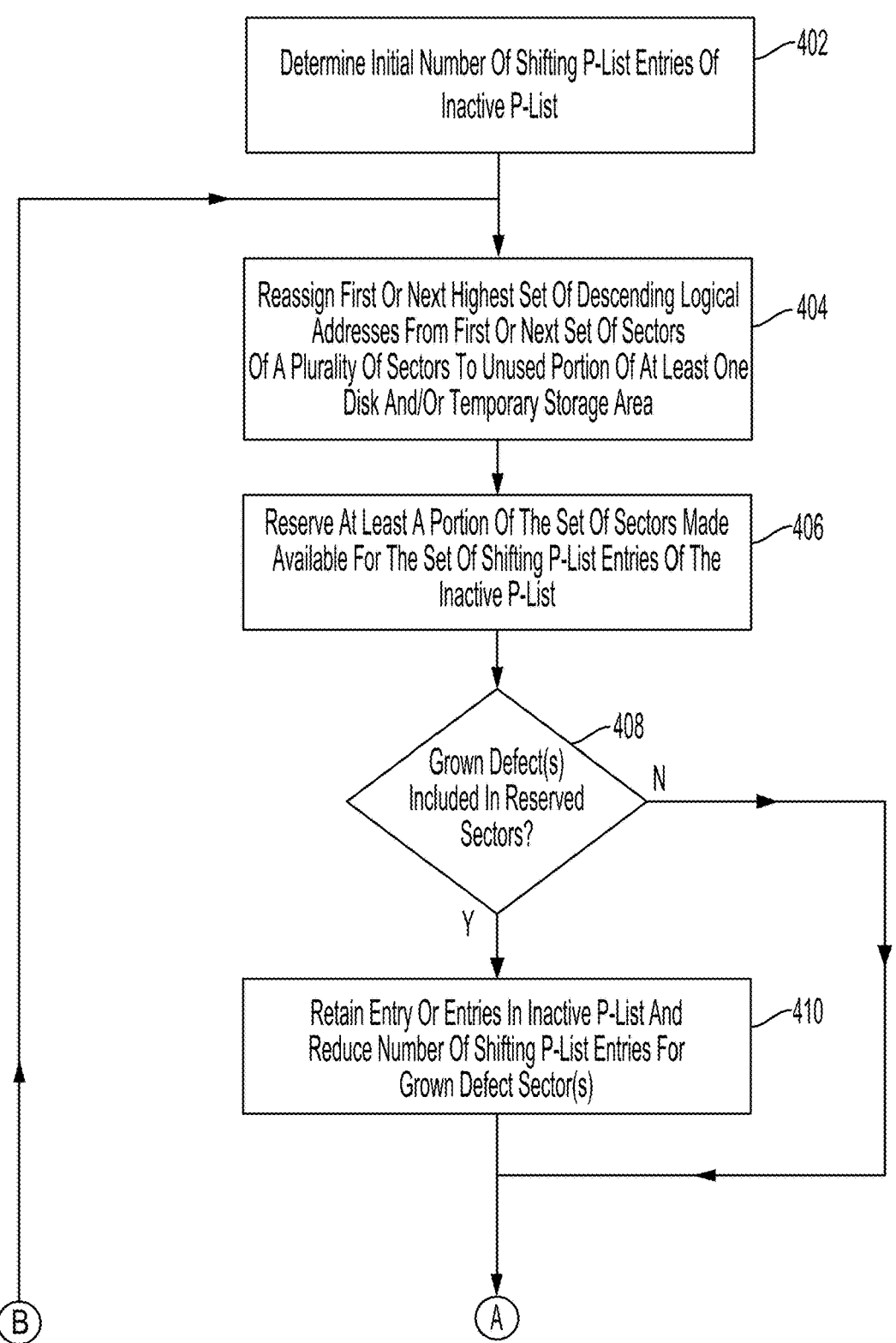
FIGS. 4A and 4B provide a flowchart for an example G-List background merging process according to one or more embodiments.
Figure 4B:
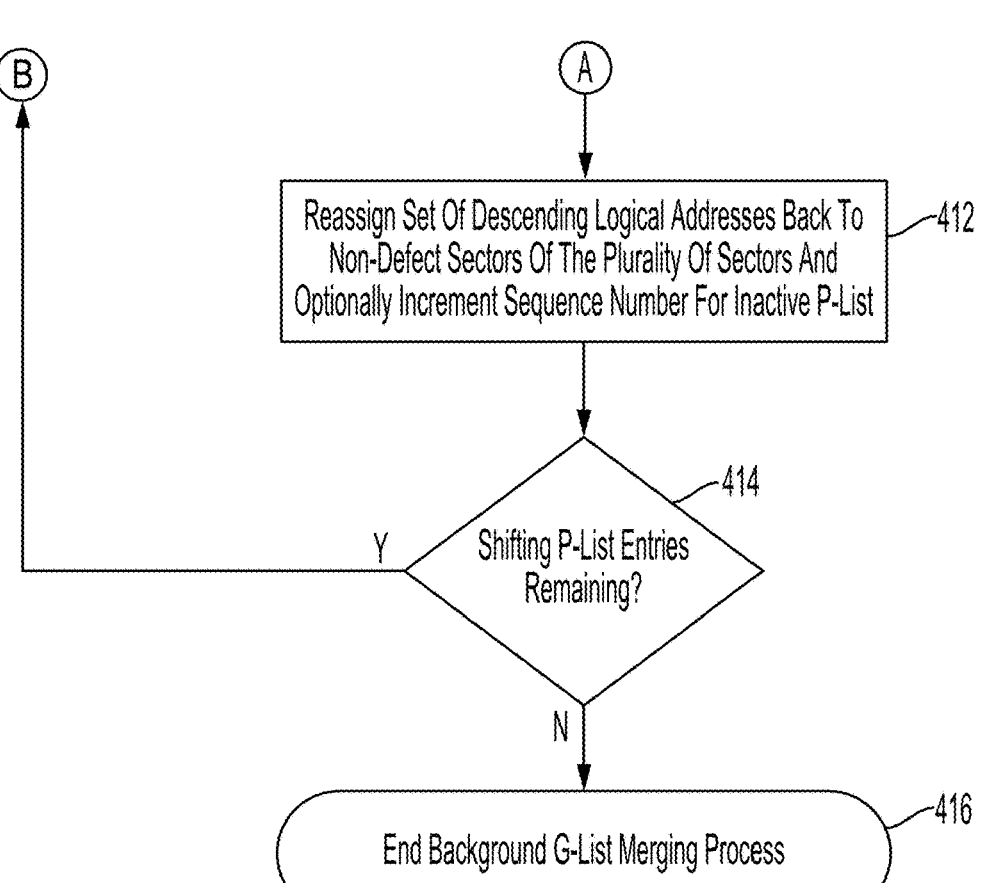

FIGS. 4A and 4B provide a flowchart for an example G-List background merging process according to one or more embodiments. The process of FIGS. 4A and 4B can be performed by, for example, circuitry 166 of DSD 100 executing defect module 10 in FIG. 1. In this regard, circuitry 166 and/or other circuitry of DSD 100 such as AE module 160 can, in some implementations, comprise a means for performing the functions of the G-List background merging process.

In block 402 of FIG. 4A, an initial number of shifting P-List entries in an inactive P-List is determined. The beginning shifting P-List entries are initially unassigned entries in the inactive version of the P-List that will be used during the merging process for absorbing or adding entries for grown defects from the G-List. In addition, the initial number of shifting P-List entries equals the number of reassigned logical addresses in each set of descending logical addresses that will be successively reassigned from the at least one disk to the temporary storage area to make room for shifting the P-List entries.

The number of shifting P-List entries can be determined in block 402 based on the number of entries in the G-List such that the number of shifting P-List entries is less than or equal to the number of entries in the G-List for grown defects. In some implementations, the G-List merging can be performed in stages of smaller sets of descending logical addresses to reduce the amount of data that needs to be relocated during the merging process and the amount of updating performed to the logical to physical translation table, which can reduce the consumption of processing and memory resources of the DSD as a background activity.

In implementations where the merging of G-List entries into the P-List is performed in stages, the number of shifting P-List entries may change for the different stages so that all of the G-List entries are eventually merged into the P-List without using extra or unneeded P-List entries. For example, if the G-List has 1,800 entries, a first stage of merging may use 1,000 shifting P-List entries and a second stage of merging may use 800 shifting P-List entries to completely merge the G-List into the P-List. In some cases, the initial number of shifting P-List entries may be adjusted to account for newly discovered grown defects encountered during the background G-List merging process. In the foregoing example, 802 shifting P-List entries may be used in the second stage if two additional grown defects are discovered during the first stage and/or between performance of the first and second stages.

In block 404 of FIG. 4, a first or next highest set of logical addresses (e.g., LBAs on the at least one disk) is reassigned from a first or next set of sectors of a plurality of sectors to an unused portion of the at least one disk and/or a temporary storage area. With reference to the example discussed above for FIGS. 2A to 2F, the unused portion of the at least one disk can correspond to unused area 34. In some implementations, a temporary storage area (e.g., temporary storage area 36 in FIGS. 2A to 2F) may be used as an intermediary for a first highest set of descending logical addresses (i.e., a range of the highest logical addresses) to reassign the logical addresses first to the temporary storage area and then to the unused portion of the at least one disk.

The data associated with the logical addresses for the first highest set of descending logical addresses is also relocated to the unused portion, which makes the first set of sectors available for the shifting P-List entries in some implementations. As discussed above for the example of FIG. 3, in some implementations, the set of shifting P-List entries may be first reserved in an unused portion of the at least one disk before shifting to the area freed by reassigning the first highest set of descending logical addresses to the unused area or the temporary storage area.

A logical to physical translation table (e.g., logical to physical translation table 18 in FIG. 1) is also updated to reflect the new locations of the reassigned logical addresses so data can be accessed in the new locations. Notably, sectors that are already identified as having a primary defect are skipped in reassigning logical addresses, since these sectors do not have logical addresses assigned to them as part of the mapping out of defects performed during the formatting process.

In some cases, the first set of sectors may already include one or more grown defects. In such cases, the logical addresses for such defective sectors will have typically already been reassigned to another non-defect sector using the logical to physical translation table as part of a grown defect handling process. The logical addresses for such defective sectors may then be reassigned to the unused portion of the at least one disk, and the data relocated to the corresponding locations in the unused portion of the disk. This may be done to facilitate sequential reading and writing of data so that a sequential range of logical addresses can be written or read faster without having to significantly reposition an HGA (e.g., HGA 110 in FIG. 1) to different locations on a disk. In other implementations, however, the reassigned logical addresses and associated data may remain in their originally reassigned non-defect sector locations.

In block 406, at least a portion of the set of sectors made available by reassigning the descending set of logical addresses is reserved for the set of shifting P-List entries. Reserving sectors can include mapping out or otherwise removing the physical addresses for the set of sectors (e.g., MBAs) from the logical to physical translation table and adding physical locators for the set of sectors (e.g., PBAs) to the inactive P-List. Removing the physical addresses for the reserved sectors from the logical to physical translation table and reassigning the logical addresses from the first set of sectors or from a next set of sectors to the unused portion of the at least one disk or the temporary storage area can temporarily prevent new logical addresses received from a host from being assigned to the reserved sectors and redirects data accesses (e.g., reads and writes) associated with the reassigned logical addresses to the current location assigned to the reassigned logical addresses in the unused portion or the temporary storage area.

Notably, sectors that have primary defects are skipped when reserving sectors for the shifting P-List entries, since these sectors already have entries in the P-List. When further iterations are performed of blocks 404 to 412 as discussed in more detail below, the remaining shifting P-List entries are successively shifted by reserving sectors of the plurality of sectors made available by reassigning descending sets of logical addresses to the temporary storage area.

In block 408, the circuitry determines if there are one or more grown defects included in the reserved sectors for the shifting P-List entries. This can be performed by checking the G-List for the physical locators (e.g., PBAs) of the sectors currently reserved for the shifting P-List entries.

If there are one or more grown defects in the reserved sectors, the circuitry in block 410 retains one or more corresponding entries of the shifting P-List entries in the inactive P-List for those grown defects and reduces the number of shifting P-List entries by the number of grown defects. An entry or entries from the G-List may eventually be removed from the G-List after adding the entry or entries for the grown defects to the active version of the P-List. As in the example above for FIGS. 2A to 2F, the particular entries assigned to the grown defects and the primary defects may shift to other entries in the inactive P-List in some implementations. In this regard, the retention of an entry in the inactive P-List for a grown defect refers to maintaining an entry in the inactive P-List for the grown defect despite its entry being shifted.

If it is determined in block 408 that the reserved sectors do not include one or more grown defects, the background G-List merging process skips block 410 and proceeds to block 412 in FIG. 4B. The descending set of logical addresses is reassigned in block 412 back to non-defect sectors of the plurality of sectors that have been made available from shifting the set of shifting P-List entries, removing no longer needed entries in an updated version of the active P-List and/or reassigning the next descending set of logical addresses to the temporary storage area.

In addition, a sequence number for the inactive P-List may be incremented to indicate the next descending set of logical addresses to be reassigned in case the background G-List merging process is interrupted, such as by an unexpected power loss to the DSD or a planned shutdown of the DSD. In other implementations, the circuitry may rely on the logical addresses assigned to the temporary storage area to indicate the next descending set of logical addresses in the event of an interruption to the background G-List merging process. In such implementations, a copy of the data stored in the temporary storage area may provide an indication of the logical addresses last reassigned to the temporary storage area before it could be overwritten with new data for a next descending set of logical addresses.

In block 414, the circuitry determines whether there are still shifting P-List entries remaining. If not, the background G-List merging process ends in block 416. As noted above, the background G-List merging process may be performed repeatedly in stages, such as to fill a first set of shifting P-List entries and then a second time to fill a second set of shifting P-List entries for a remainder of grown defects identified in the G-List, or a portion thereof.

If there are still shifting P-List entries remaining in block 414, the process returns to block 404 in FIG. 4A to reassign the next highest descending set of logical addresses from a next set of sectors of the plurality of sectors in a next iteration of blocks 404 to 412. In this regard, the descending sets of logical addresses are successively reassigned to the temporary storage area in block 404, and at least portions of the sets of sectors are successively reserved for the remaining entries in the set of shifting P-List entries in block 406 until the shifting P-List entries are filled by grown defect locations. Similarly, the sets of descending logical addresses are successively reassigned back to non-defect sectors of the plurality of sectors in block 412 for each iteration or shift of the shifting P-List entries.

Those of ordinary skill in the art will appreciate with reference to the present disclosure that other implementations of a background G-List merging process are possible. For example, in other implementations, the process of FIGS. 4A and 4B may be paused at different points as a background activity and then resumed using, for example, a sequence number associated with the inactive P-List indicating a number of iterations performed of blocks 404 to 412 and/or the logical addresses currently assigned to the temporary storage area.

Figure 5:
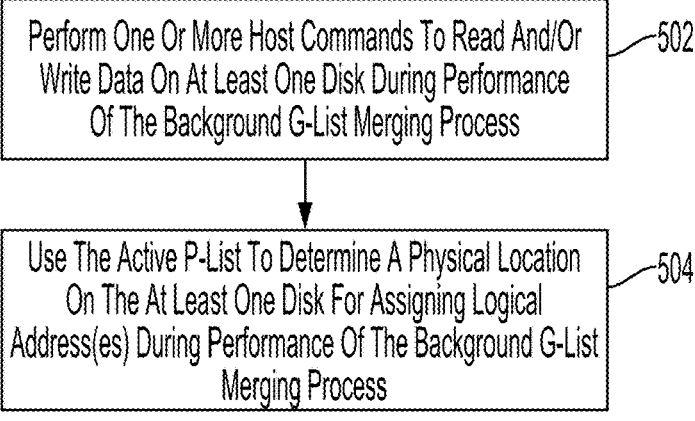
FIG. 5 is a flowchart for a command performance process during the G-List merging according to one or more embodiments.

FIG. 5 is a flowchart for a command performance process according to one or more embodiments. The process of FIG. 5 can be performed by, for example, circuitry 166 of DSD 100 executing defect module 10 in FIG. 1. In this regard, circuitry 166 and/or other circuitry of DSD 100 such as AE module 160 can, in some implementations, comprise a means for performing the functions of the command performance process of FIG. 5.

In block 502, one or more host commands are performed to read and/or write data on at least one disk while a background G-List merging process is being performed to merge entries of a G-List into a P-List. As discussed above for the merging process of FIGS. 4A and 4B, the present disclosure can use two versions of the P-List and shift a set of P-List entries from an inactive version of the P-List to reduce the changes being made to the logical to physical translation table to facilitate merging the G-List into the P-List as a background activity. This advantageously enables the DSD to continue to perform host commands to access data on the at least one disk while the merging takes place. In addition, the translation table is not completely reset with the background merging of the present disclosure, so the data is not effectively erased as would be the case for the conventional reformatting typically required to add grown defect locations to the P-List.

In block 504, an active P-List is used to determine a physical location on the at least one disk for assigning at least one logical address while performing the background G-List merging process. While the inactive version of the P-List is being updated for the sectors being reserved for possible P-List entries and the addition or filling of the shifting P-List entries when grown defects are encountered, the active version of the P-List can be used by the circuitry of the DSD for assigning available non-defect sectors. The need to assign sectors to logical address can arise from, for example, receiving new logical addresses from a host or from a garbage collection process to reclaim sectors storing obsolete data.

Since the grown defects are mapped out and accounted for in the G-List, the active P-List combined with the G-List provide the subset of defect sectors that cannot be used in the logical to physical translation table for new logical addresses or logical addresses that are to be reassigned to a new physical location. In this regard, when an entry for a grown defect is removed from the G-List during the merging, the active version of the P-List should already be updated to include an entry for the grown defect.

Those of ordinary skill in the art will appreciate with reference to the present disclosure that other implementations of the command performance process of FIG. 5 are possible. For example, in other implementations, there may not be a need to assign a logical address while merging the entries of the G-List into the inactive P-List, as in block 504. In some implementations, the assignment of a logical address to a previously unassigned sector location may instead temporarily interrupt the background G-List merging process, and any updates made to the inactive P-List are made to the active P-List before assigning the logical address. The background G-List merging process may then resume after the assignment of the logical address.

Figure 6:
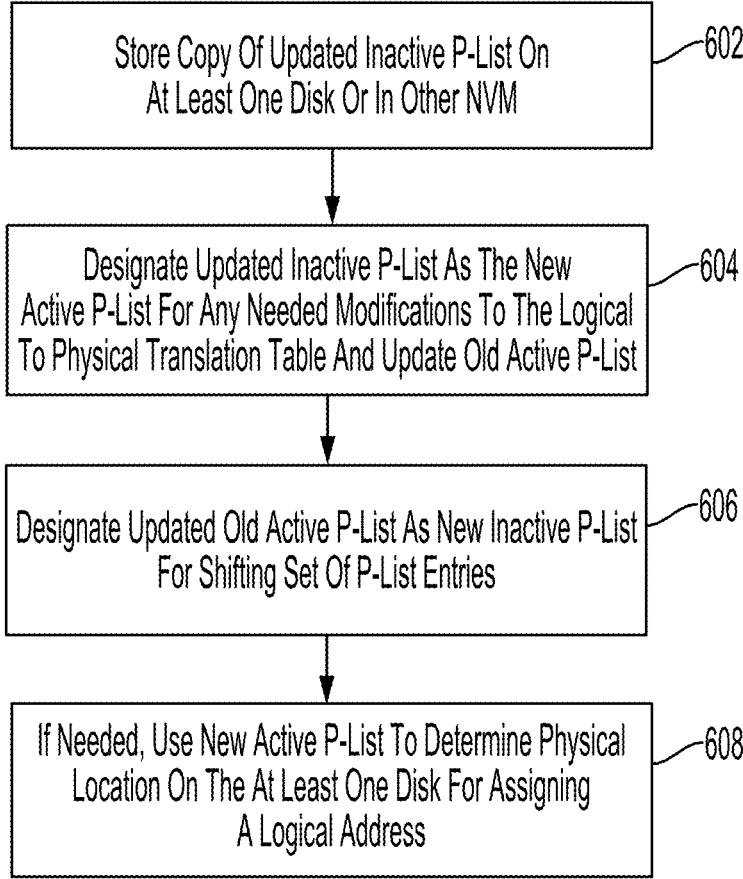
FIG. 6 is a flowchart for a P-List switching process according to one or more embodiments.

FIG. 6 is a flowchart for a P-List switching process according to one or more embodiments. The P-List switching process of FIG. 6 may be performed in iterations as in the example of FIGS. 2A to 2F discussed above where the active and inactive P-Lists switch roles or are toggled to make piecemeal or successive updates to the active P-List without affecting use of the logical to physical translation table during operation. The process of FIG. 6 can be performed by, for example, circuitry 166 of DSD 100 executing defect module 10 in FIG. 1. In this regard, circuitry 166 and/or other circuitry of DSD 100 such as AE module 160 can, in some implementations, comprise a means for performing the functions of the P-List switching process of FIG. 6.

In block 602, the circuitry stores a copy of an updated inactive P-List on at least one disk of the DSD or in another non-volatile memory of the DSD (e.g., disk 120 or NVM 178 in FIG. 1). As discussed above with the command performance process of FIG. 5, updates resulting from the shifting P-List entries are made to the inactive P-List before designating the inactive P-List as the new active P-List. A copy of the updated inactive P-List is checkpointed or stored in NVM memory (e.g., P-List-03 20 stored in NVM 178 in FIG. 1) in case the merging process is interrupted. As discussed above, portions of the logical to physical translation table are updated when logical addresses are reassigned during the merging process, which enables the continued use of the logical to physical translation table during the merging process.

In block 604, the updated inactive P-List is designated the new active P-List for any needed modifications to the logical to physical translation table, and the old active P-List is updated for the changes previously made to the old inactive version of the P-List.

In block 606, the updated old active P-List is designated as a new inactive P-List for a next iteration of shifting P-List entries. In some implementations, the switching between the active and inactive versions of the P-List can be triggered based on the reassignment of logical addresses from a temporary storage area back to non-defective sectors on the disk. A flag or other indicator in some implementations may be used to indicate or designate which P-List is currently the active or inactive P-List. For example, the P-List data structure may include a field with a value set to "1" to indicate that the P-List is currently the active P-List to be used by the circuitry for assigning logical addresses and a value set to "0" to indicate that the P-List is currently the inactive P-List to be used for shifting the shifting P-List entries.

In block 608, the new active P-List (i.e., the old inactive P-List) may be used to determine a physical location on the at least one disk for assigning a logical address. As discussed above, the G-List and the active P-List can be used to determine an available, defect-free sector for a new logical address or for a reassigned logical address.

Those of ordinary skill in the art will appreciate with reference to the present disclosure that other implementations of the P-List switching process of FIG. 6 are possible. For example, block 608 may be omitted for a particular iteration of the P-List switching process, since the DSD may not need to assign or reassign a logical address to a new sector location during the particular stage or iteration of the merging process.

FIG. 7 is a flowchart for a G-List merge resuming process after an interruption according to one or more embodiments. The process of FIG. 7 can be performed by, for example, circuitry 166 of DSD 100 executing defect module 10 in FIG. 1. In this regard, circuitry 166 and/or other circuitry of DSD 100 such as AE module 160 can, in some implementations, comprise a means for performing the functions of resuming the G-List merge resuming process as in FIG. 7.

In block 702, the resuming process begins after an interruption, such as an unexpected loss in power to the DSD, a planned shutdown of the DSD, or a sudden need for additional processing and/or memory resources by the DSD. As noted above, the G-List merging process can advantageously be performed as a background activity that enables the concurrent access of data for reading and writing on the at least one disk. Since the G-List merging process can take place over a relatively long time, such as several days, the resuming process provides a way to resume the G-List merging process from where the process left off before the interruption.

As noted above in the foregoing examples, in implementations where the inactive P-List is modified in a volatile memory, a copy of the inactive P-List may be checkpointed or updated in non-volatile memory each time the merge process switches between the active and inactive P-Lists. When resuming from an interruption, the checkpointed inactive P-List can be recovered, and the G-List merge resuming process can be used to find the location where the set of shifting P-List entries should be reserved for the next iteration of the merging process and which logical addresses should be reassigned to the temporary storage area.

In block 704, the circuitry identifies at least one of one or more logical addresses (e.g., LBAs) stored in a temporary storage area (e.g., temporary storage area 36 in FIGS. 2A to 3) and a sequence number associated with an inactive P-List. In the case of using one or more logical addresses stored in the temporary storage area, the temporary storage area may be read to identify logical addresses stored in one or more sectors of the temporary storage area, such as part of a header for the sector. In some cases, a sector or block in the temporary storage area may store, for example, the LBAs or a range of LBAs that have been reassigned to the temporary storage area. The logical address or addresses can then provide an indication of the last set of descending logical addresses reassigned to the temporary storage area.

In the case of using a sequence number associated with the inactive P-List, the sequence number may be stored as part of the inactive P-List or in a different location to indicate a number of iterations performed of reassigning the sets of descending logical addresses. The circuitry may then multiply the sequence number with the predetermined number of initial shifting P-List entries and subtract this product from the highest logical address to determine the last set of descending logical addresses reassigned to the temporary storage area. As another example, each of the active P-List and the inactive P-List may include or have a sequence number for each time the P-List has been updated or checkpointed. The sequence numbers of the two P-Lists may be compared in some implementations to determine the status of the G-List merging process.

In block 706, the identified one or more logical addresses and/or the sequence number are used to determine a location on the at least one disk to reassign a next descending set of logical addresses to or from the temporary storage area. In implementations that may not use a sequence number, logical addresses read from the temporary storage area may be looked up in the logical to physical translation table. If the physical locations from the translation table indicate that the logical addresses are assigned to the temporary storage area, the resumption of the merge process should reassign the logical addresses from the temporary storage area back to available, non-defect sectors on the at least one disk that correspond to the logical addressing sequence. If the physical locations from the translation table indicate that the logical addresses are not assigned to the temporary storage area, the resumption of the merge process should reassign a next descending set of logical addresses from the at least one disk to the temporary storage area and relocate the associated data to overwrite the obsolete data currently stored in the temporary storage area.

In some cases, the logical to physical translation table may be used to determine whether the G-List merging process was interrupted in the middle of relocating data or reassigning logical addresses to or from the temporary storage area. The physical locations (e.g., MBAs) for the last reassigned set of logical addresses may be obtained from the logical to physical translation table, and the circuitry may determine whether the physical locations all correspond to the temporary storage area or to the disk locations. All of the physical locations should be in either the temporary storage area or at the disk locations if the logical address reassignment was not interrupted. If the physical locations for the set of logical addresses are split between the temporary storage area and the disk locations, the remaining logical addresses from the set may be reassigned to or from the temporary storage area when resuming the G-List merging process.

In some implementations, the sequence number may be used to calculate a location on the at least one disk by multiplying the sequence number with the initial number of shifting P-List entries or size of the temporary storage area and subtracting this product from the highest PBA to identify the beginning of the last set of sectors that had its logical addresses reassigned to the temporary storage area. One or more of these sectors may be read to determine the logical addresses stored as metadata in the sectors and then compared to the PBAs indicated in the translation table to determine if the next set of descending logical addresses needs to be reassigned to or from the temporary storage area.

Those of ordinary skill in the art will appreciate with reference to the present disclosure that other implementations of the G-List merge resuming process of FIG. 7 are possible. For example, in situations where the inactive P-List is only stored in an NVM, the G-List merging process can instead be resumed by identifying the physical locators in the inactive P-List for the set of shifting P-List entries, as opposed to using a sequence number for the inactive P-List or the logical addresses assigned to the temporary storage area. In addition, those of ordinary skill in the art will appreciate that other ways of using a sequence number, logical addresses stored in the temporary area, and/or the translation table are possible to determine where to resume the G-List merging process.

The foregoing systems and methods for merging the G-List into the P-List can facilitate the merging as a background activity that enables data access commands to be performed during the merging process. In addition, the disclosed systems and methods provide a significant improvement over the conventional way of adding G-List entries to the P-List, since the foregoing systems and methods do not require reformatting, which ordinarily erases all user data.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
   at least one disk including a plurality of sectors configured to store data;
   at least one memory configured to store an active Primary defect List (P-List) including entries indicating defective sectors identified during formatting of the at least one disk, a Grown defect List (G-List) including entries indicating defective sectors identified after formatting the at least one disk, and an inactive P-List including entries for accepting entries from the G-List; and
circuitry configured to merge entries of the G-List into the active P-List, the merging including at least in part performing iterations of:
reassigning a descending set of logical addresses from a set of sectors of the plurality of sectors to a temporary storage area of the DSD;
reserving at least a portion of the respective set of sectors corresponding to the reassigned descending set of logical addresses for a set of shifting P-List entries of the inactive P-List;
in response to one or more grown defect sectors indicated by the G-List being included in the reserved sectors, retaining one or more entries of the shifting P-List in the inactive P-List for the one or more grown defect sectors and reducing the set of shifting P-List entries by the number of retained entries before shifting toward a next respective set of sectors; and
reassigning the descending set of logical addresses from the temporary storage area back to non-defect sectors of the plurality of sectors.

2. The DSD of claim 1, wherein the circuitry is further configured to perform one or more host commands to read or write data on the at least one disk during performance of the merging.

3. The DSD of claim 1, wherein the circuitry is further configured to use the active P-List to determine a physical location on the at least one disk for assigning a logical address while merging entries of the G-List into the inactive P-List.

4. The DSD of claim 1, wherein the circuitry is further configured to:
reassign a first set of logical addresses having the highest logical addresses from a first set of sectors of the at least one disk to an unused portion of the at least one disk; and
reserve the first set of sectors for the set of shifting P-List entries.

5. The DSD of claim 1, wherein the number of reassigned logical addresses in each set of the descending sets of logical addresses equals a predetermined number of initially unassigned entries in the inactive P-List, and wherein the predetermined number is less than or equal to an initial number of entries in the G-List.

6. The DSD of claim 1, wherein the circuitry is further configured to update a logical to physical translation table used to map logical addresses to locations on the at least one disk after reassigning each descending set of logical addresses back to non-defect sectors of the plurality of sectors.

7. The DSD of claim 1, wherein after each iteration of reserving the at least a portion of the respective set of sectors for the set of shifting P-List entries, the circuitry is further configured to:
designate the inactive P-List as a new active P-List; and
designate the active P-List as a new inactive P-List for reserving at least a portion of a next respective set of sectors for the set of shifting P-List entries.

8. The DSD of claim 7, wherein the circuitry is further configured to store a copy of the inactive P-List on the at least one disk or in a non-volatile memory of the DSD before designating the inactive P-List as the new active P-List.

9. The DSD of claim 1, wherein the circuitry is further configured to increment a sequence number for the inactive P-List after reassigning a descending set of logical addresses from a set of sectors of the plurality of sectors to the temporary storage area.

10. The DSD of claim 1, wherein the circuitry is further configured to:
resume merging entries of the G-List into the active P-List after an interruption by at least in part:
identifying at least one of one or more logical addresses stored in the temporary storage area and a sequence number associated with the inactive P-List; and
using the identified at least one of the one or more logical addresses and the sequence number to determine a location on the at least one disk to reassign a descending set of logical addresses to or from the temporary storage area.

11. A method for managing defect sectors of at least one disk of a Data Storage Device (DSD), the method comprising:
merging entries of a Grown defect List (G-List) into a Primary defect List (P-List), the G-List including entries indicating defective sectors identified on the at least one disk after formatting the at least one disk, and the P-List including entries for defective sectors identified during formatting of the at least one disk, the merging including at least in part:
successively reassigning descending sets of logical addresses from respective sets of sectors of a plurality of sectors of the at least one disk to a temporary storage area of the DSD;
successively reserving at least a portion of the respective sets of sectors corresponding to the reassigned descending sets of logical addresses for a set of shifting P-List entries of an inactive version of the P-List,
wherein in response to one or more grown defect sectors indicated by the G-List being included in the reserved sectors, one or more entries of the shifting P-List entries are retained in the inactive version of the P-List for the one or more grown defect sectors and the set of shifting P-List entries is reduced by the number of retained entries before shifting toward a next respective set of sectors; and
successively reassigning the descending sets of logical addresses from the temporary storage area back to non-defect sectors of the plurality of sectors.

12. The method of claim 11, further comprising performing one or more host commands to read or write data on the at least one disk during the merging.

13. The method of claim 11, further comprising using an active version of the P-List to determine a physical location on the at least one disk for assigning a logical address while merging entries of the G-List into the P-List.

14. The method of claim 11, further comprising:
reassigning a first set of logical addresses having the highest logical addresses from a first set of sectors of the at least one disk to an unused portion of the at least one disk; and
reserving the first set of sectors for the set of shifting P-List entries.

15. The method of claim 11, wherein the number of reassigned logical addresses in each set of the descending sets of logical addresses equals a predetermined number of initially unassigned entries in the inactive version of the P-List, and wherein the predetermined number is less than or equal to an initial number of entries in the G-List.

16. The method of claim 11, further comprising updating a logical to physical translation table used to map logical addresses to physical block addresses on the at least one disk after reassigning each descending set of logical addresses from the temporary storage area back to non-defect sectors of the plurality of sectors.

17. The method of claim 11, wherein after each iteration of reserving the at least a portion of the respective set of sectors for the set of shifting P-List entries, the method further comprises:

designating the inactive version of the P-List as a new active version of the P-List; and designating the active version of the P-List as a new inactive version of the P-List for reserving a next respective set of sectors for the set of shifting P-List entries.

18. The method of claim 11, further comprising incrementing a sequence number for the inactive version of the P-List after reassigning a descending set of logical addresses from a set of sectors of the plurality of sectors to the temporary storage area.

19. The method of claim 11, further comprising:

resuming merging entries of the G-List into the P-List after an interruption by at least in part:

identifying at least one of one or more logical addresses stored in the temporary storage area and a sequence number associated with the inactive version of the P-List; and using the identified at least one of the one or more logical addresses and the sequence number to determine a location on the at least one disk to reassign a descending set of logical addresses to or from the temporary storage area.

20. A Data Storage Device (DSD), comprising:

at least one disk including a plurality of sectors configured to store data;

at least one memory configured to store an active Primary defect List (P-List) indicating defective sectors identified during formatting of the at least one disk, a Grown defect List (G-List) indicating defective sectors identified after formatting the at least one disk, and an inactive P-List including entries for accepting entries from the G-List; and means for merging the entries of the G-List into the P-List, the merging including at least in part performing iterations of:

reassigning descending sets of logical addresses from respective sets of sectors of the plurality of sectors of the at least one disk;

reserving at least a portion of the respective sets of sectors corresponding to the reassigned descending sets of logical addresses for a set of shifting P-List entries of the inactive P-List;

in response to one or more grown defect sectors indicated by the G-List being included in the reserved sectors, retaining one or more entries of the shifting P-List entries in the inactive P-List for the one or more grown defect sectors and reducing the set of shifting P-List entries by the number of retained entries before shifting toward a next respective set of sectors; and reassigning the descending sets of logical addresses back to non-defect sectors of the plurality of sectors.

\* \* \* \* \*